(12) United States Patent
Schwenk et al.

(10) Patent No.: US 12,295,290 B2
(45) Date of Patent: May 13, 2025

(54) CANNABIS PLANT AND HARVESTING TOOL

(71) Applicant: Verge Industries LLC, Chicago, IL (US)

(72) Inventors: August Schwenk, Albany, NY (US); Augustine Verciglio, Rochester, NY (US); Richard Share, Macedon, NY (US)

(73) Assignees: August Schwenk, Albany, NY (US); Augustine Verciglio, Chicago, IL (US)

( * ) Notice: Subject to any disclaimer, the term of this patent is extended or adjusted under 35 U.S.C. 154(b) by 713 days.

(21) Appl. No.: 17/557,820

(22) Filed: Dec. 21, 2021

(65) Prior Publication Data

US 2022/0264800 A1 Aug. 25, 2022

Related U.S. Application Data

(60) Provisional application No. 63/152,056, filed on Feb. 22, 2021.

(51) Int. Cl.
*A01D 45/06* (2006.01)
*A01D 1/06* (2006.01)
*A01D 1/14* (2006.01)

(52) U.S. Cl.
CPC .............. *A01D 45/065* (2013.01); *A01D 1/06* (2013.01); *A01D 1/14* (2013.01)

(58) Field of Classification Search
CPC .......... A01D 45/065; A01D 1/00–1/14; A01G 3/00–3/088; A01G 5/00–5/06; A47J 17/02; C13B 5/02
See application file for complete search history.

(56) References Cited

U.S. PATENT DOCUMENTS 61,940 A * 2/1867 Huff et al. ............. C10G 73/06
196/14.5
862,734 A * 8/1907 Hendricks ............. B26B 27/007
30/298

(Continued)

FOREIGN PATENT DOCUMENTS

CN 201077867 Y 6/2008
CN 104493841 A 4/2015

(Continued)

OTHER PUBLICATIONS

"International Search Report and Written Opinion", from corresponding PCT patent application No. PCT/US2022/070749, May 13, 2022.

(Continued)

*Primary Examiner* — Adam J Behrens
*Assistant Examiner* — Madeline I Runco
(74) *Attorney, Agent, or Firm* — Neal, Gerber & Eisenberg LLP

(57) ABSTRACT

Harvesting devices and methods for *cannabis* plants that enable efficient harvesting of floral material from *cannabis* plants. In various embodiments, the harvesting devices better facilitate the holding of the *cannabis* plant during the bucking process. In various embodiments, the harvesting devices better facilitate the bucking process and specifically the removal of the floral material from the *cannabis* plant with minimal damage to the floral material while minimizing user fatigue.

16 Claims, 29 Drawing Sheets

(56) References Cited

U.S. PATENT DOCUMENTS

| | | | | |
|---|---|---|---|---|
| 1,047,040 | A | * | 12/1912 | Gerstenfield et al. .. B26B 13/20 30/232 |
| 2,167,337 | A | | 7/1939 | De |
| 2,646,621 | A | | 7/1953 | Paul |
| 2,848,841 | A | | 8/1958 | Mathew |
| 3,303,562 | A | * | 2/1967 | Booth ................. B23D 49/005 30/503 |
| 3,491,445 | A | | 1/1970 | Gallo |
| 4,646,437 | A | * | 3/1987 | Blomqvist .............. A01G 3/08 30/294 |
| 5,044,115 | A | | 9/1991 | Richardson |
| D356,929 | S | | 4/1995 | Lee |
| 5,561,904 | A | | 10/1996 | Chung |
| 5,857,316 | A | | 1/1999 | Murdock |
| 5,899,019 | A | | 5/1999 | Groves |
| 5,937,626 | A | * | 8/1999 | Gorman .............. A01D 46/247 30/294 |
| 7,909,687 | B2 | | 3/2011 | Al-harbi |
| 8,641,495 | B2 | | 2/2014 | Kneppers et al. |
| 8,666,552 | B2 | | 3/2014 | Zeelen |
| 10,785,906 | B2 | | 9/2020 | Olson et al. |
| 2012/0279614 | A1 | * | 11/2012 | Terrell ................. A01G 23/091 144/24.13 |
| 2016/0050852 | A1 | | 2/2016 | Lee |
| 2016/0374386 | A1 | | 12/2016 | Desmarais et al. |
| 2018/0035610 | A1 | | 2/2018 | Wieker |
| 2018/0194020 | A1 | * | 7/2018 | Waymire .............. B26B 11/006 |
| 2018/0303033 | A1 | | 10/2018 | Jones |
| 2018/0317404 | A1 | | 11/2018 | Atteberry |
| 2019/0124840 | A1 | | 5/2019 | Bates |
| 2019/0274248 | A1 | | 9/2019 | Mosman et al. |

FOREIGN PATENT DOCUMENTS

| | | | |
|---|---|---|---|
| CN | 210470323 U | | 5/2020 |
| DE | 892086 A | | 10/1953 |
| DE | 1043702 B | | 11/1958 |
| EP | 0383410 A1 | | 8/1990 |
| FR | 2539952 A2 | * | 8/1984 |
| FR | 2794611 A | | 12/2000 |
| JP | 3157466 U | * | 2/2010 |
| WO | WO-2014203065 A1 | * | 12/2014 |
| WO | 2020102830 A1 | | 5/2020 |
| WO | 2020177002 A1 | | 9/2020 |

OTHER PUBLICATIONS

"DeBudder Bucket Lid", downloaded at: https://www.amazon.com/s?k=debudder+bucket+lid+original+420+brand&crid=Z5GERTN66LS2&sprefix=debudder%2Caps%2C54&ref=nb_sb_ss_fb_1_8_ts-doa-p; available prior to Feb. 22, 2021.

* cited by examiner

CANNABIS PLANT AND HARVESTING TOOL

PRIORITY CLAIM

This application claims priority to and the benefit of U.S. Provisional Patent Application No. 63/152,056, filed Feb. 22, 2021, the entire contents of which are incorporated herein by reference.

FIELD

The present disclosure relates to devices and methods for harvesting floral material from the stems of plants, and particularly from the stems of *cannabis* plants.

BACKGROUND

Commercial *cannabis* and industrial hemp farmers do not have economical and effective equipment and processes that maximize efficient removal of intact floral material (such as but not limited to flowers) from the stems of *cannabis* plants. The process of removing the floral material from the stem is generally known as bucking. For medicinal and recreational *cannabis* products alike, the floral material is removed from the stems prior to processing and consumption of the floral material. The physical nature of the *cannabis* plant makes many known harvesting equipment and processes inefficient or difficult to use for such *cannabis* plants. Additionally, abrading, crushing, handling, and processing can negatively affect the floral structure and decrease the quality as well as value of the *cannabis* product. As such, the present disclosure provides various harvesting devices and methods for efficiently removing intact the floral material from the stems of *cannabis* plants while reducing user actions and user fatigue.

More specifically, the floral material of the *cannabis* plant is the most valuable part of the *cannabis* plant because it contains the desirable cannabinoid oils. In the past decade, the demand for medicinal, recreational, and industrial *cannabis* products has increased rapidly. With changes in the legal environment, new opportunities and marketplaces for quality *cannabis* products have been made possible. Additionally, since the passage of the United Stated 2018 farm bill, *cannabis* plants found to have less than 0.3% THC by weight are considered to be industrial hemp and are federally legal in the United States. This de-criminalization has created new marketplaces for non-psychoactive *cannabis* products in both the medicinal and recreational markets. The growing demand for quality products has spurred farmers across the globe to grow tens of thousands of acres of *cannabis* plants.

To harvest *cannabis* plants on an industrial scale, certain farmers use expensive modified equipment from other industries. Such equipment is often custom one-off solutions built by the farmers. Due to the prohibition of *cannabis* for much of the past century, a wide variety of specialized agricultural equipment has not being developed for the *cannabis* plants at the same levels as for other major agricultural products. Recently, manufacturers have recognized this problem, however, their equipment still fails to meet the advancing, and specific needs of the modern *cannabis* farmer.

The primary limitation for *cannabis* specific equipment is the unique nature of the *cannabis* plant as opposed to traditional crops. *Cannabis* plants have many stems that are strong and fibrous, have numerous side stems, and have significant foliage. This complex plant geometry makes harvesting the *cannabis* floral material relatively difficult. Additionally, the *cannabis* floral material has a delicate structure and is very resinous or sticky. The combination of these physical factors often leads to mechanical failure when forge harvesters, silage choppers, and other roller mill style harvest equipment are used to process *cannabis* plants. The poor results when using equipment configured for harvesting other crops (such as conventional buckers) has left *cannabis* farmers desiring *cannabis* specific harvesting devices and harvesting methods. Other largely used methods of harvesting are either by hand or with scissors, which is extremely labor intensive.

As a solution to harvesting a plant with many stems, a common theme emerges in known equipment and methods. The plants are selectively cut apart such that stems are cut from the main stalk and individually processed to remove the flower in the bucking process. Similarly, nearly all known equipment and methods utilize the same fundamental principle to buck these individual stems. Specifically, various sized circular apertures are formed in a flat cutting face and each prepared stem is inserted and mechanically drawn through the flat cutting face. The act of precutting stems to be individually processed makes operating this bucking equipment a very labor intensive process, while additional handling of the *cannabis* plant reduces the final quality of the *cannabis* floral material. Furthermore, as the stem thickness tapers towards the apical flower, the circular aperture chosen to match the cut end of the stem is no longer a close match to the stem's outer diameter, and as a result will often degrade or ruin the most valuable flowers on the individual stem.

Certain known equipment demonstrate the emergence of new dry harvest buckers that utilize rotating assemblies with abrasive fingers or bristles that remove the floral material from the stem. Thus equipment improves upon conventional buckers in their efficiency, however, this equipment compromises on quality. By using fast moving bristles to remove the floral material from the stem when dry, nearly all of the floral material structure tends to be degraded.

It should further be appreciated that the process of drying can be one of the most expensive, and difficult operations in successfully harvesting *cannabis* plants. *Cannabis* plants are typically hung to dry (similar to tobacco plants) and then bucked once at approximately 10-15% moisture. Unlike tobacco plants, *cannabis* plants take up much more physical space, and cannot be packed as densely (as tobacco plants) in a drying facility. Issues with mold, insects, and air flow can also be common in the industry. Furthermore, the stems are one of the most moisture dense plant parts, yet they do not contain valuable oil like the floral material. Thus, the process of drying stems and floral material is not only time and space consuming, but does not have a real valuable return.

It should be appreciated from the above, that *cannabis* producers of all sizes need more *cannabis* specific harvesting devices and harvesting methods to be able to produce higher quality *cannabis* products, without being compromised by labor intensity requirements. Thus, there is a long-felt need for harvesting devices and methods that address the above-mentioned limitations of current harvesting equipment and methods.

SUMMARY

Various embodiments of the present disclosure relate to harvesting devices and methods that enable efficient harvesting of floral material from *cannabis* plants. In various embodiments, the harvesting devices better facilitate the holding of the *cannabis* plant during the bucking process. In various embodiments, the harvesting devices better facilitate the bucking process and specifically the removal of the floral material from the *cannabis* plant with minimal damage to the floral material while minimizing user fatigue.

Various embodiments of the present disclosure relate to a *cannabis* plant harvesting tool including a grip, a blade support connected to the grip, and a blade including two cutting fingers removably connectable to the two support fingers. The blade support including the two support fingers define a first stem receiving channel. The blade and the cutting fingers define a second stem receiving channel. In various such embodiments, the first stem receiving channel of the blade support is U-shaped and the second stem receiving channel of the blade support is V-shaped. Various such embodiments includes a plurality of separate fasteners that extend through respective fastener receiving openings of the blade support and into respective fastener receiving openings of the blade to facilitate attachment and removal of the blade from the blade support.

These and other features and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying drawings in which corresponding reference symbols indicate corresponding parts.

DETAILED DESCRIPTION

First and Second Example Harvesting Devices

Figure 1:
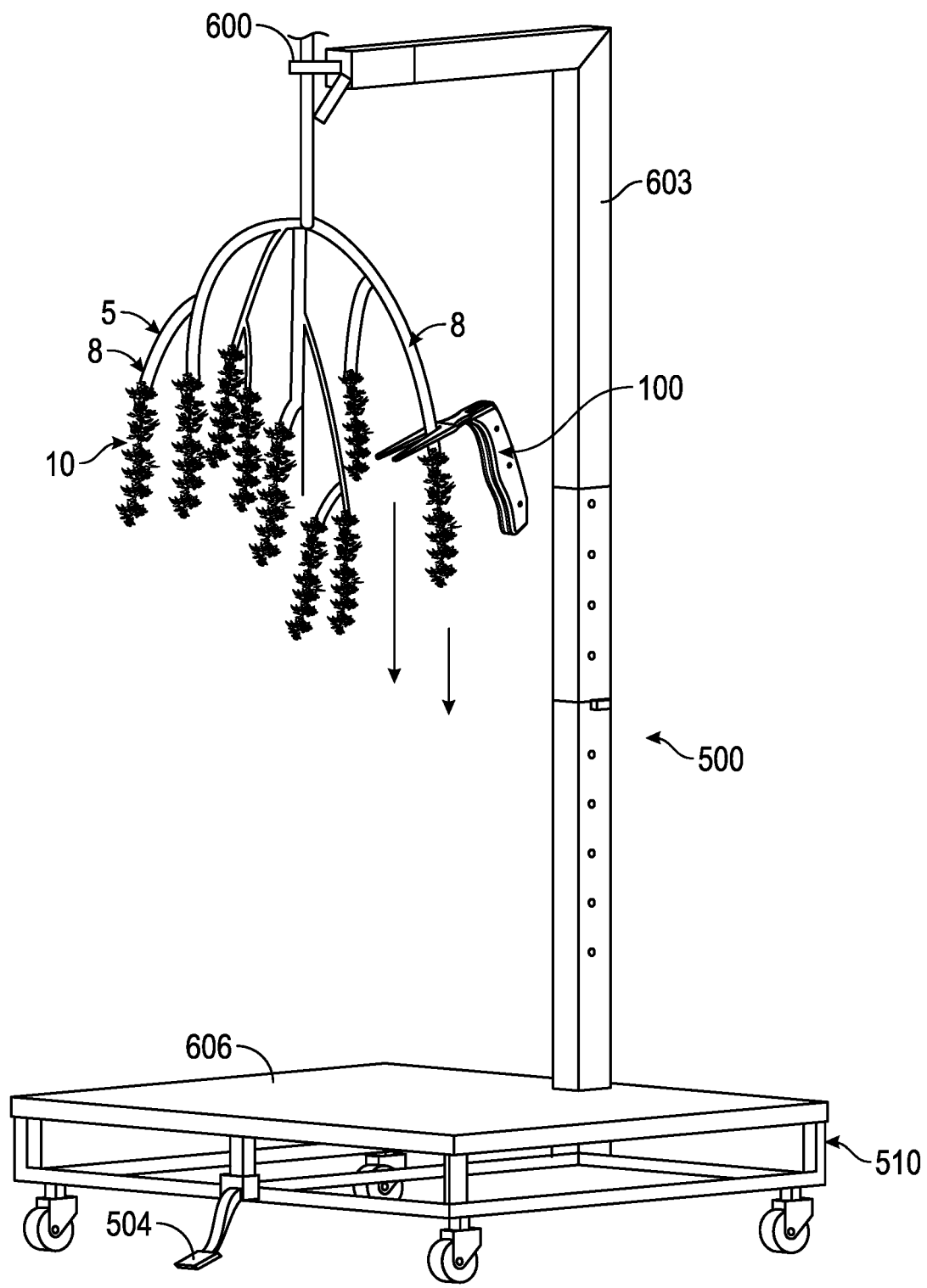
FIG. 1 is a perspective view of harvesting devices in the form of a harvesting workstation for *cannabis* plants and a non-powered handheld harvesting tool in accordance with example embodiments of the present disclosure.

Turning now to the figures, FIG. 1 illustrates two example harvesting devices of the present disclosure, and specifically including a handheld harvesting tool 100 of one example embodiment of the present disclosure and a harvesting device in the form of a plant gripper workstation 500 of one example embodiment of the present disclosure.

FIG. 1 generally illustrates a gripper 600 of the plant harvesting workstation 500 gripping of a *cannabis* plant 5 (or other high value plant) featuring floral material 10 (which can include fruit, herbs, and spices) requiring removal from a stem 8 of the plant 5 and a harvesting tool 100 positioned on the stem 8 prior to being used to remove the floral material 10 from the stem 8. In other words, the handheld harvesting tool 100 is illustrated inserted on a stem 8 of the *cannabis* plant 5 in preparation for stripping the floral material from the stem 8 of the *cannabis* plant 5.

The example gripper workstation 500 including the gripper 600 is configured to hold a whole plant 5 (or part thereof), suspended by a boom arm 603 above a collection plate 506. The gripper workstation 500 includes a foot pedal 504 connected to a frame 510 that supports the collection plate 506 and can include an electrical signal communication line or pneumatic communication line (not shown) that connects the foot pedal 504 to the gripper 600 to facilitate selective actuation of the gripper 600.

Figure 2:
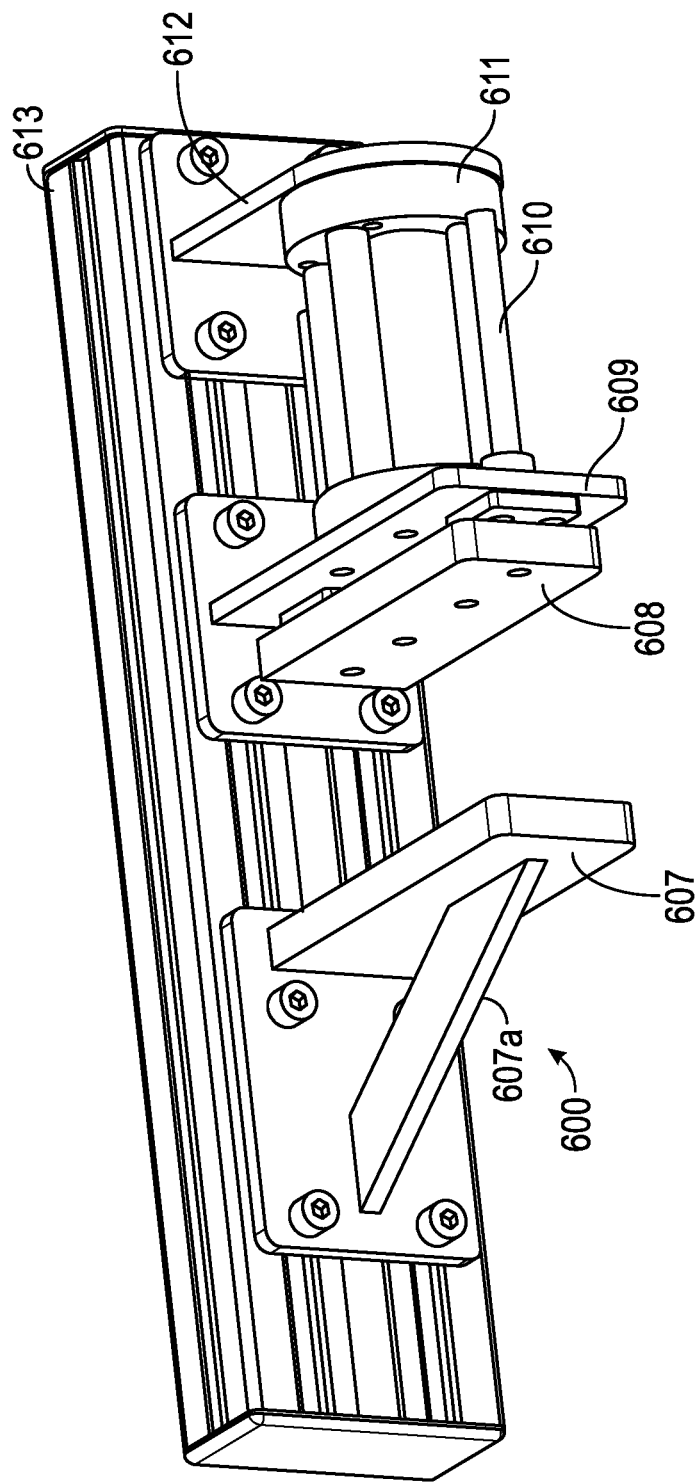
FIG. 2 is a perspective view of a *cannabis* plant gripper of the harvesting workstation of FIG. 1.

FIG. 2 shows the gripper 600 in greater detail. The gripper 600 includes a pneumatic cylinder 611, with a manually or electronically operable solenoid valve 604 (numbered but not shown), textured grip plates 607 and 608, deflection slides 610, and mounting brackets 609 and 612. The front mounting bracket 607 has an extra gusset 607a for added rigidity. The gripper 600 is configured to releasably, reliably, and securely grip a stem of *cannabis* plant such that a user can grip a handheld harvesting tool such as the example handheld harvesting tools 100, 1100, or 2100 described herein to perform the bucking process.

In this example embodiment, the gripper 600 is made from suitable metal materials; however, it should be appreciated that the gripper 600 can be made from other suitable materials in accordance with the present disclosure. It should also be appreciated that the gripper 600 can be otherwise suitably configured, shaped, and sized in accordance with the present disclosure.

Figure 3:
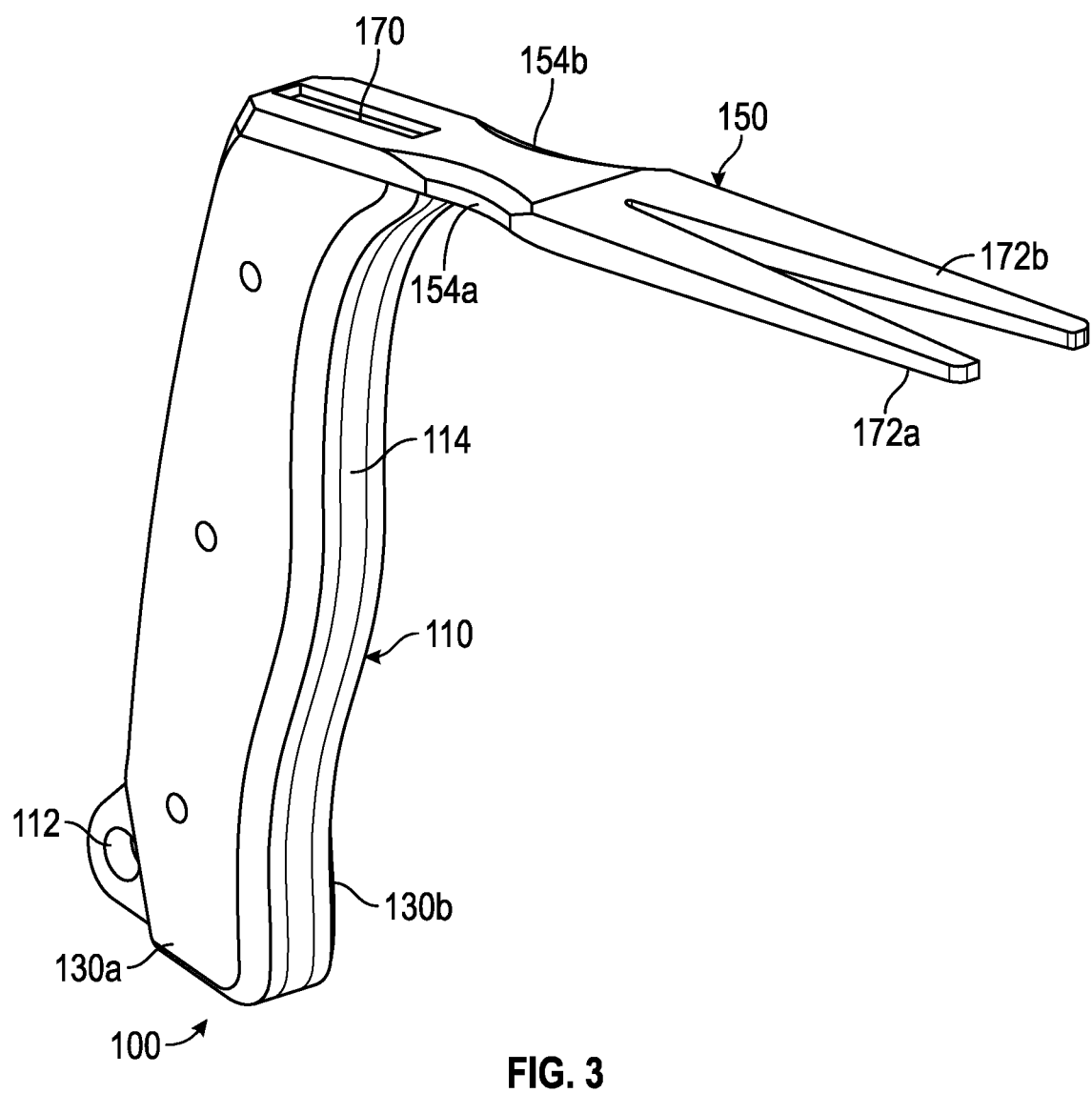
FIG. 3 is an enlarged perspective view of a non-powered handheld harvesting tool of one example embodiment of the present disclosure.
Figure 4:
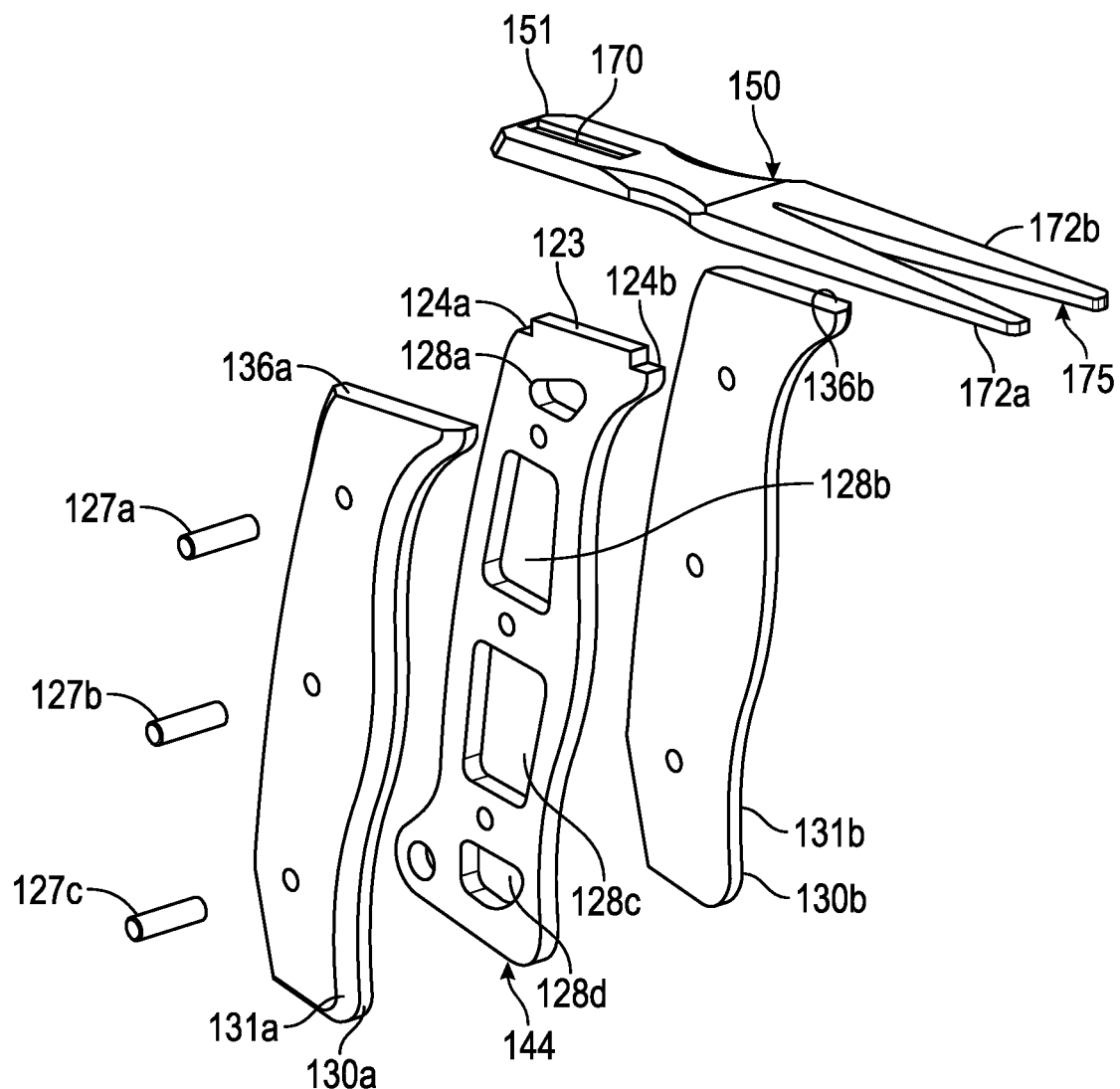
FIG. 4 is an exploded perspective view of the non-powered handheld harvesting tool of FIG. 3.
Figure 5:
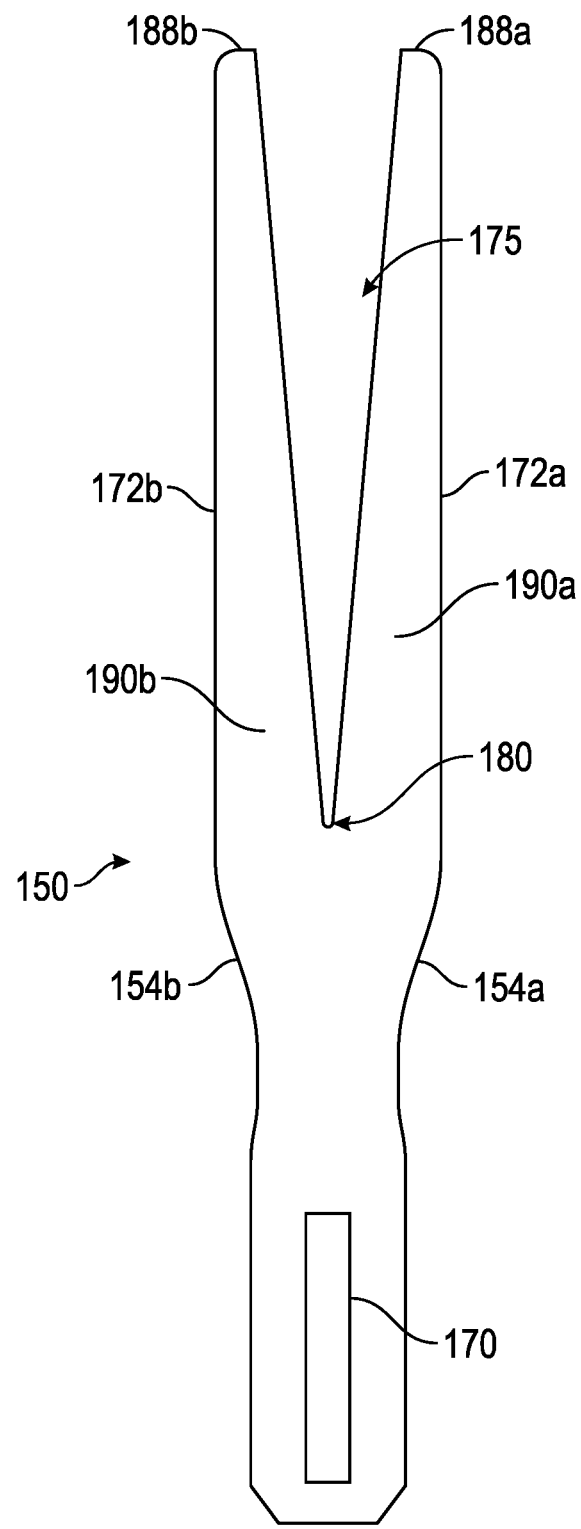
FIG. 5 is a top view of the blade of the non-powered handheld harvesting tool of FIG. 3.

The example non-powered handheld harvesting tool 100 is shown in greater detail FIGS. 3 and 4. This example handheld harvesting tool 100 generally includes a grip 110 (including a metal handle 114) and metal blade 150 attached to the grip 110 and specifically the handle 114 such that the grip 110 is connected to and supports the blade 150.

In this illustrated example embodiment, the grip 110 includes a handle 114 that defines a plurality of cutouts 128a, 128b, 128c, and 128d in its interior to reduce weight. The handle 114 is the main structural component upon which, at an obtuse angle the blade 150 can be connected and specifically welded. The shape of the metal handle 114 is slightly bowed in the back, and has two valleys in the front such to securely and comfortably fit in a user's hand.

The grip 110 includes plastic or rubber pads 130a and 130b that mimic the shape of the handle 114 and are securely fixed with an epoxy adhesive and dowel pins 127a, 127b, and 127c to the metal handle 114. The pads can but do not need to have but can have a chamfer or fillet at the respective exterior edges 131a and 131b. The chamfer/fillet at the top edges 136a or 136b can be configured to form a flush mate with the bottom surface of the blade 150. The top of the handle 114 defines two rectangular cutouts 124a and 124b that leave a rectangular tab 123 remaining. The remaining tab 123, which is slightly shorter than the thickness of the blade 150, fits into the matching hole 170 cut from the blade 150. When fit into the hole 170, the difference in the height of the tab 123 and the thickness of the blade 150 creates a weld pool recess for seamless fastening. Welded together, the grip 110 is permanently fixed to the blade 150 at an obtuse angle to mitigate interaction of the user's hand and the floral material. In this example embodiment, the handle 114 is made from a suitable metal material; however, it should be appreciated that the handle 114 can be made from other suitable materials in accordance with the present disclosure. It should also be appreciated that the handle 114 can be otherwise suitably configured, shaped, and sized in accordance with the present disclosure.

Figure 6:
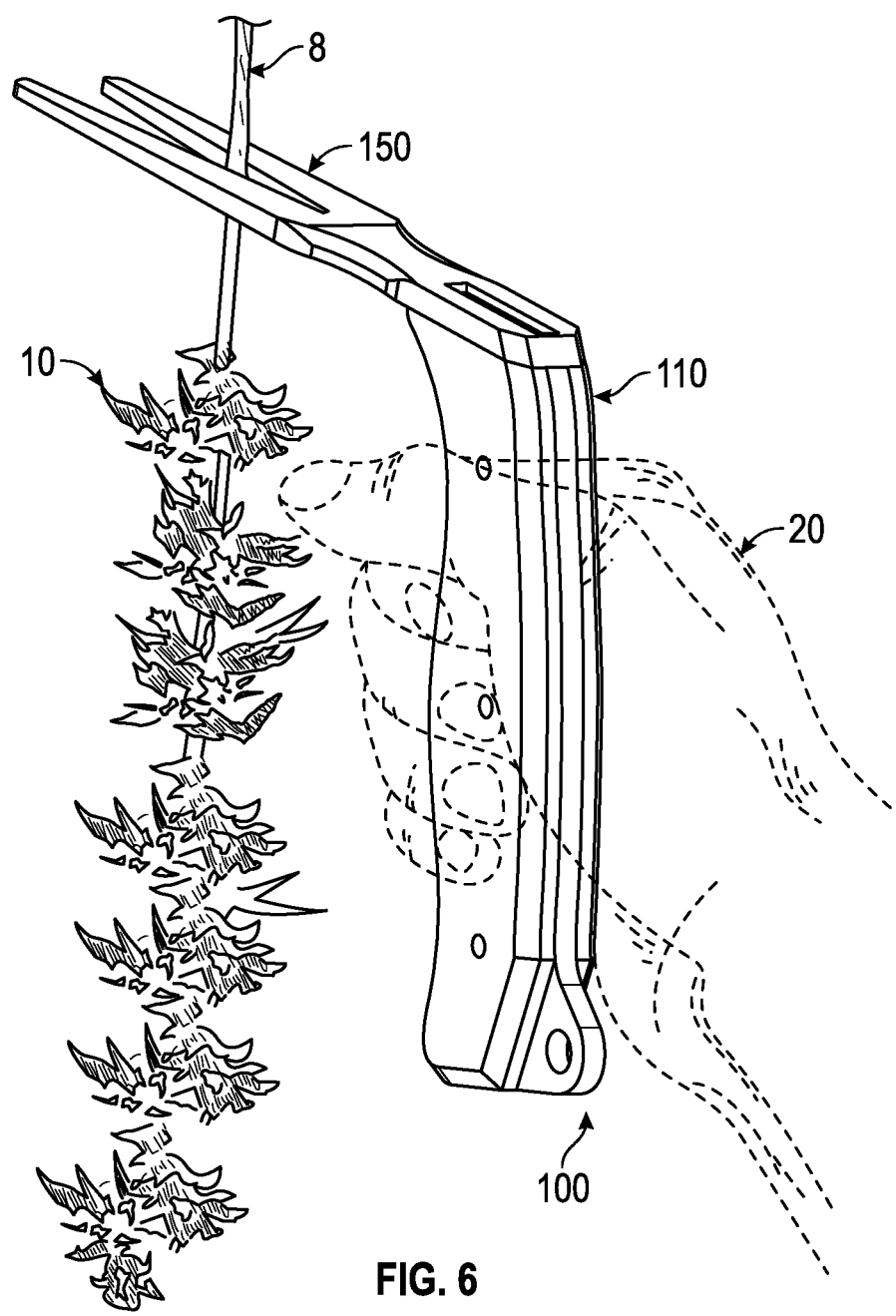
FIG. 6 is a perspective view of the non-powered handheld harvesting tool of FIG. 3 shown in use.
Figure 7:
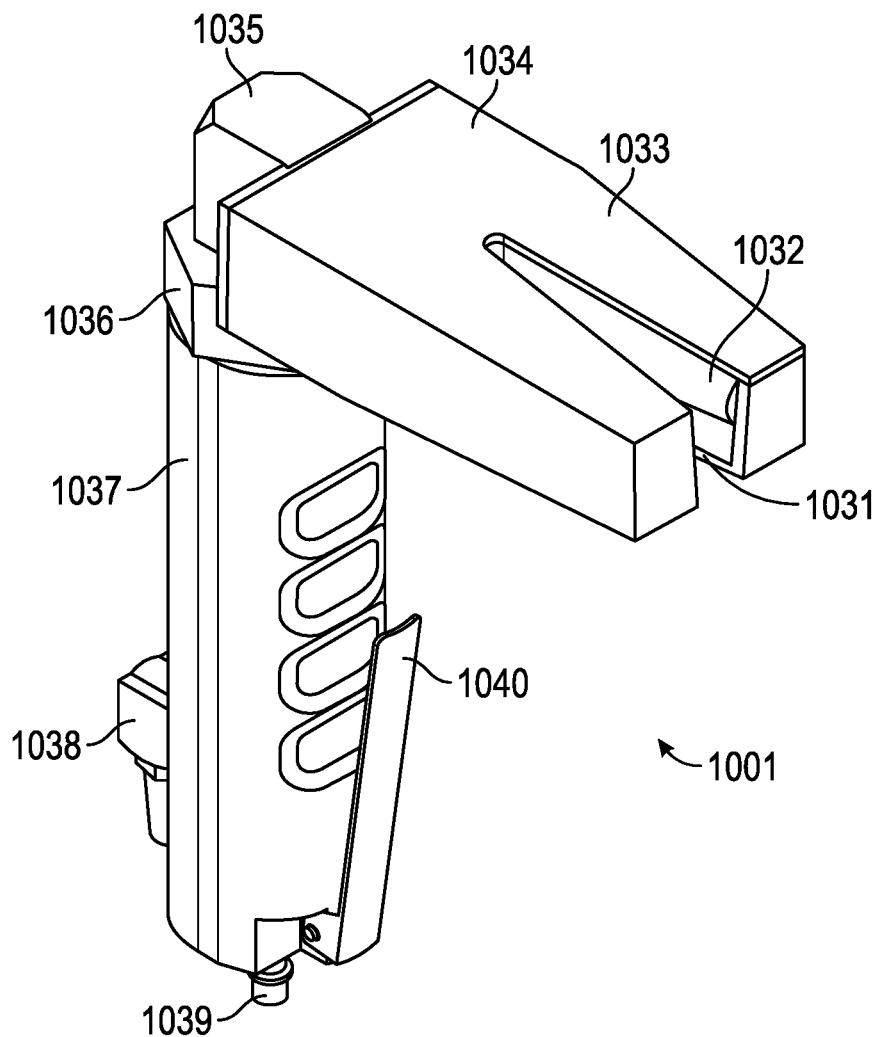
FIG. 7 is a top perspective view of a powered handheld harvesting tool of another example embodiment of the present disclosure.

The blade 150, which is made from stainless steel in this example embodiment, extends outwardly from the welded joint, parallel to the ground (when held in the upright position shown in FIG. 6). The blade 150 includes a mounting end 151 and two fingers 172a and 172b connected to and extending from the mounting end 151. The blade 150 defines, in front of the welded joint, two arc shaped features 154a and 154b that gradually increase the width of the blade 150 from the narrower width of the grip 110. These cutouts also provide an alternative top gripping area of the blade 150 that can reduce fatigue, and improve precision use of the harvesting tool 100 such as in selecting smaller stems. From the forward end of the arcs, and along the midplane of the blade 150 is the apex 180 of the V-shaped channel 175. The apex 180 is a small round hole that has a diameter less than the thickness of the blade 150. Tangent to the edge of the apex 180 are two identical cuts that extend out to the end of the blade 150 to form the V-shaped channel 175. The V-shaped channel 175 is of a narrow angle in various embodiments of the present disclosure, and is 10 degrees in this example embodiment. The V-shaped channel 175 is defined by a transverse (such as vertical) surface the thickness of the blade 150. The surfaces that defines the V-shaped channel 175 and the opposing stripping surfaces 190a and 190b meet at a perpendicular angle such that edges are formed along the length of the channel 175, and around the apex 180. It should be appreciated that the tool can alternatively benefit from having the stripping surfaces not being 90 degrees. In other words, the edges can be alternatively formed at angles other than 90 degrees. For example, the bottom surfaces can be at 45 degrees to form the lower portion of the cutting edge and the top surfaces can be at 135 degrees to form the top portion of the cutting edge. Additionally, the V-shaped channel 175 can be fashioned such that along the length of the V-shaped channel 175 are increasing diameter arced cutouts (not shown in FIGS. 1, 3, 4, 5, and 6) that make up the length of the channel 175. These cutouts along the length of the channel 175, if employed in the harvesting tool, can increase the effective blade length and can act to provide a larger interaction area thus reducing overall pressure on the floral material. The angle of the V-shaped channel 175 and the width of the blade 150 are related such that they define the length of the tool 100. In this example embodiment, the distal end of the tool 100 has been truncated to come to a soft points 188a and 188b. The width of the opening at the end of the V-shaped channel 175 is significantly greater than the width of the tips 188a and 188b, such that the user can easily insert and select a stem, even on interior stems of a *cannabis* plant. In this example embodiment, the blade 150 is made from suitable metal materials; however, it should be appreciated that the blade 150 can be made from other suitable materials in accordance with the present disclosure. It should also be appreciated that the blade 150 can be otherwise suitably configured, shaped, and sized in accordance with the present disclosure.

Specific detail will now be made to the gripping and use of the harvesting tool 100 by a user as illustrated in FIG. 6. The grip 110 can be held by a user's hand 20 with the user's palm along the back edge of the tool 100, with the user's thumb closing over one side, and with the user's index and fore fingers wrapped around the other side of the grip 110. The blade 150, with its relatively narrow tips, and relatively wide opening, make selection, and insertion of the tool 100 onto a stem 8 simple for the user. By applying a minimal amount of forward force, either or both of the tool 100 and the selected stem 8 can be moved such that the stem 8 moves towards the apex 180 until the diameter of the stem 8 is approximately equal to the width at that point between the fingers 172a and 172b that form the V-shaped channel 175. At this position, the user can apply the necessary downward force to strip floral material 10 from the stem 8. This downward force is in line with the configuration of the grip 110 of this tool 100. It should be appreciated that as the stem diameter decreases towards the apical floral material, the stem 8 can be inserted further towards the apex 180 of the V-shaped channel 175, ensuring uniform stripping performance along the length of the stem 8.

In this example embodiment, the tool 100 defines a small hole 112 in the bottom rear of the handle 114 such that a wrist strap (not shown) can be employed with the tool 100. The wrist strap enables the quick release of the tool 100 to free both of a user's hands, and then to quickly pick up a plant, toggle the grip (or handle), and quickly regrip the tool.

Third Example Harvesting Device

Figure 8:
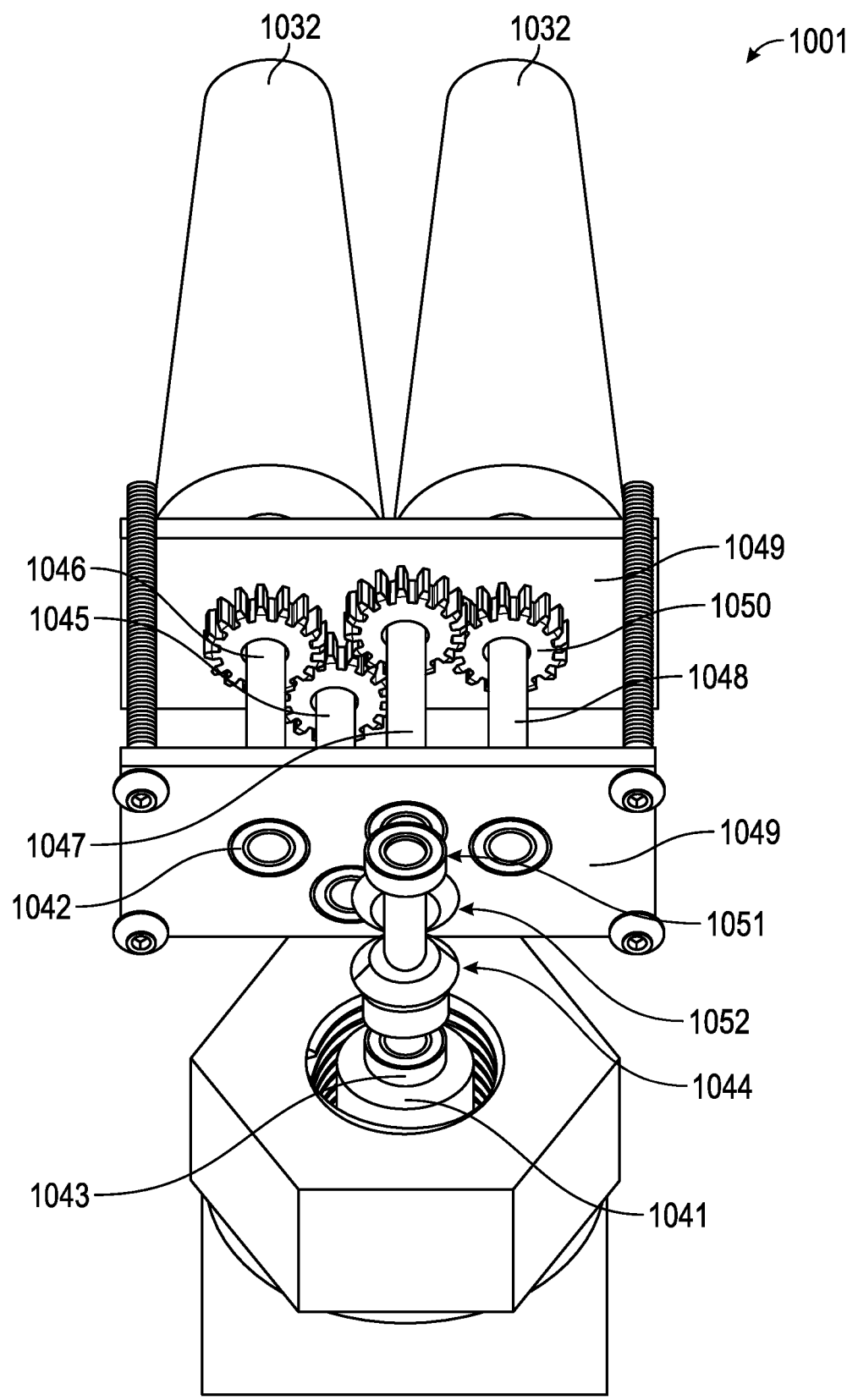
FIG. 8 is a partial perspective view of the powered handheld harvesting tool of FIG. 7, with several components removed to illustrate certain of the components thereof.
Figure 9:
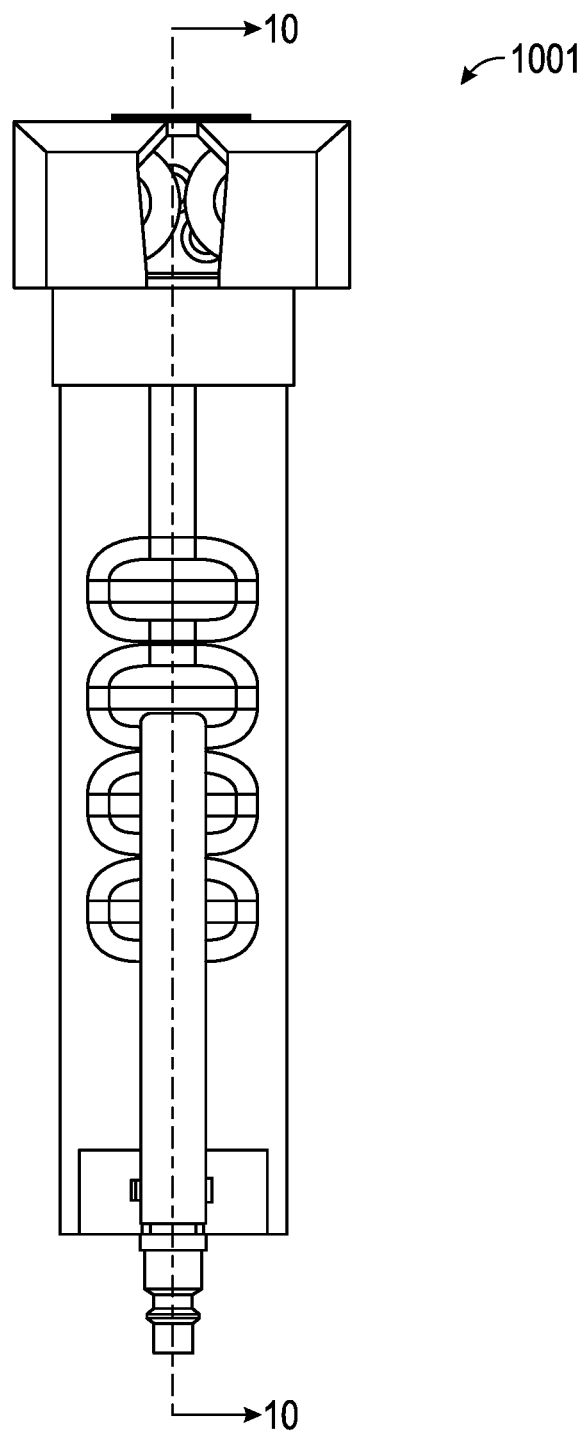
FIG. 9 is a front elevational view of the powered handheld harvesting tool of FIG. 7.
Figure 10:
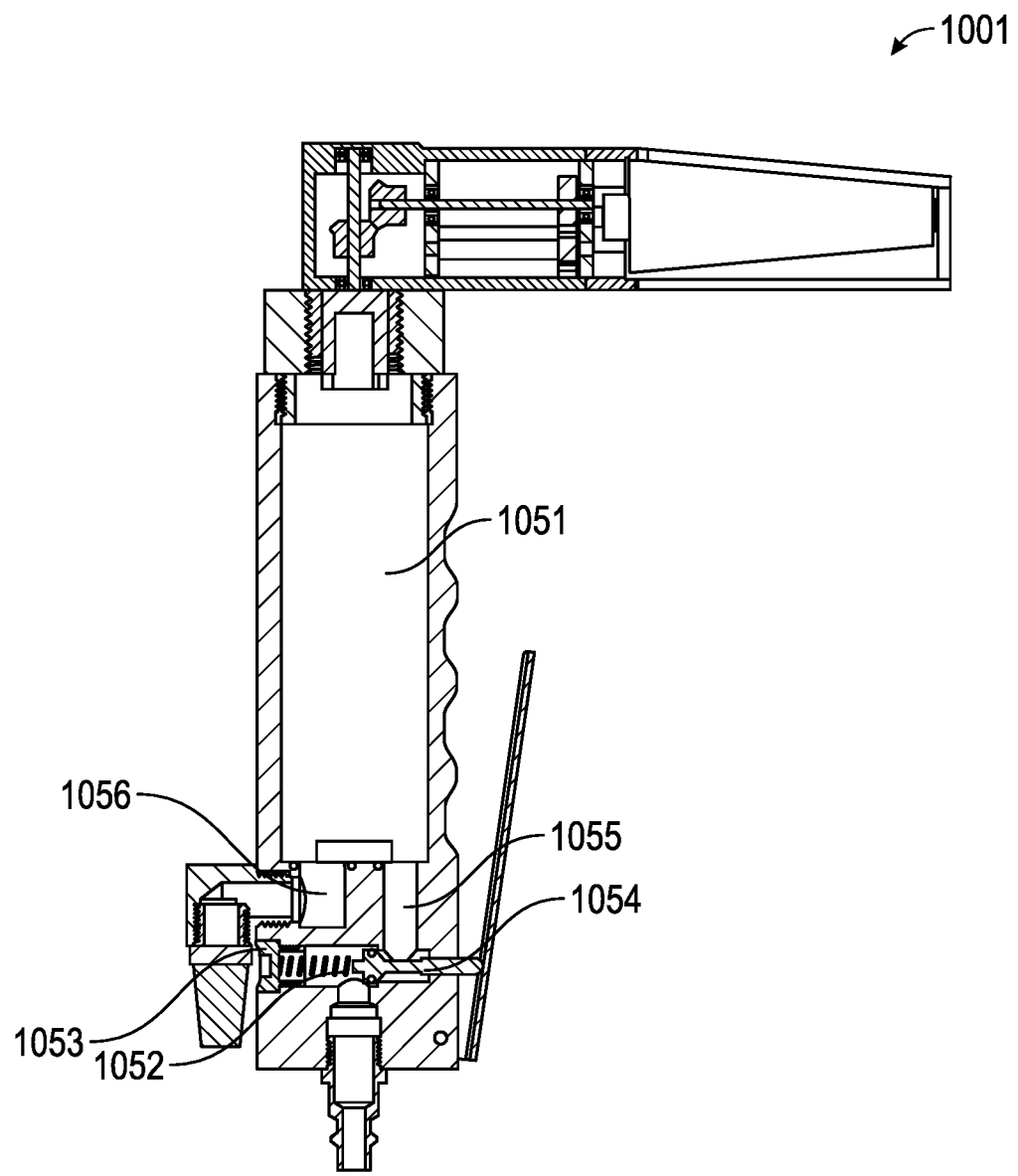
FIG. 10 is a cross-sectional view of the powered handheld harvesting tool of FIG. 7 taken substantially along line 10-10 of FIG. 9.

Turning now to FIGS. 7, 8, 9, and 10, a third harvesting device in the form of a powered version of a handheld harvesting tool 1001 of one example embodiment of the present disclosure is illustrated. The primary components of the powered hand tool 1001 a set of parallel tapered rollers 1032 that define a V-shaped channel 1031, a stripping box 1033, a counter rotational gearbox 1034, an input drive gearbox 1035, a master nut 1036, a motor housing 1037, a muffler 1038, and a pneumatic quick connect 1039. As best illustrated in FIG. 10, a pneumatic vane motor 1051 provides rotational power to the input drive gearbox 103, and is mechanically operated through the use of a trigger 1040. The trigger dictates the flow of air by opening and closing the inlet tube 10545 through the use of the trigger slide 10564 and the return spring 1052. Assembly is made possible through the use of a spring cap 10553, threaded into the motor housing 1037.

This powered variant provides mechanical assistance to the user in drawing the plant stem through the V-shaped channel 1031. To do this, counter rotational parallel tapered rollers 1032 will reduce or eliminate the downward force necessary to be applied by the user. Floral material will still be stripped from the stem in a substantially similar manor as with the V-shaped channel of the non-powered harvesting tool. To accommodate this change in form, the bottom side of the stripping box 1033 functions as the stripping face or blade. The other three faces of the stripping box 1033 conceal and shield the parallel tapered rollers 1032. The top face has a V-shaped channel similar to that on the stripping face; however, it has a larger diameter apex.

FIG. 8 features the powered hand tool 1001 with multiple outer pieces removed to better illustrate the drivetrain of the tool 1001. The pneumatic motor transfers its energy directly to the drive shaft 1041. The drive shaft runs vertically from the motor through the input gearbox 1035, and is held in position by ball bearings 1043 and 1051, and fit into the input gear box 1035. Securely positioned onto the drive shaft 1041 is a miter gear 1044 that serves to translate the motors torque to the complimentary miter gear fastened to the one end of the primary gear shaft 1047. To position and enable free rotation of the primary gear shaft 1047, idler gear shaft 1045, left drive gear shaft 1046, and right gear shaft 1048, there are two identical bearing plates 1049, each with four bearings 1041 arranged, and press fit to enable the proper meshing of the drive gears. The left and right gear shaft extends past the bearings on the front plate for fastening of the tapered rollers. Two additional bearings are pressed into the front of the stripping box, to ensure concentric rotation and reduce the deflection.

The angle of taper to the rollers 1032 are defined by the angle of the V-shaped channel 1031. Like the other embodiments, it should be appreciated that there can be similar increasing diameter arced cutouts that form the V-shaped channel 1031. In this example embodiment, the rollers 1032 are constructed from stainless steel, and can be knurled for increased friction with a plant stem. In another embodiment, the rollers can be constructed of a high durometer rubber and or include a grooved slot. This would be similar to a very low threads per inch running from the narrow, to thicker end of the rollers. The purpose of the variations can aid in drawing a plant stem towards the apex of the V-shaped channel.

In this embodiment, the top assembly is fastened by bolts that span from the input drive gearbox and secure to the stripping box. These bolts will mate the input drive gearbox, counter rotational gearbox and stripping box in turn securing the bearing plates. The master nut that is threaded into the motor housing and the input drive gearbox fastens the parts together, with the motor/driveshaft assembly securely incased.

In this embodiment, the top assembly is fastened by bolts that span from the input drive gearbox 1035 and secure to the stripping box 1033. These thru-bolts will mate the input drive gearbox, counter rotational gearbox 1034 and stripping box 1033 in turn fastening the bearing plates 1049 and 1050 into each of their respective recess. The master nut 1036, threaded into the motor housing and the input drive gearbox fastens the parts together, with the motor/driveshaft assembly securely incased.

FIGS. 9 and 10 illustrate the schematic front view and schematic side section view of the powered hand tool 1001 showing drive gears and other components therein.

It should also be appreciated that the powered version of a handheld harvesting tool 1001 can be otherwise suitably configured, shaped, and sized in accordance with the present disclosure.

It should be appreciated from the above that in various embodiments, the harvesting tool includes a handle and a head fixedly secured to the handle, wherein the head includes a stripping plate, a slot defined in the stripping plate, a first roller arranged on a first side of the slot, a second roller arranged on a second side of the slot and spaced apart from the first roller, and a motor operatively arranged to drive the first and second rollers. In various such embodiments, a stem of a plant can be positioned to engage or be engaged by the first and second rollers, such that the rollers force the stem through the head until a floral material of the plant is removed from the stem by the stripping plate.

It should be appreciated from the above that in various embodiments, the second roller is arranged at an angle with respect to the first roller, the angle being greater than 0 degrees and less than 90 degrees. In various such embodiments, the motor is arranged in the handle. In various embodiments, the motor is a pneumatic vane motor. In various embodiments, the handle includes a trigger operatively arranged to activate and deactivate the motor. In various embodiments, the harvesting tool further includes at least one gearbox connecting the motor to the first and second rollers. In various embodiments, at least one gearbox includes an input drive gearbox connected to the motor, and a counter rotational gearbox connected to the input drive gearbox, the first and second rollers being connected to the counter rotational gearbox. In various embodiments, the handle further includes a muffler. In certain such embodiment, the rollers are parallel and/or tapered.

It should be appreciated from the above that various embodiments of the present disclosure provide a harvesting tool including a handle and a head fixedly secured to the handle, wherein the head includes a stripping plate that defines a slot, a first roller arranged on a first side of the slot, and a second roller arranged on a second side of the slot and spaced apart from the first roller. Various such embodiments further include a motor operatively arranged to drive the rollers, wherein a stem of a plant can be operatively arranged to be engaged by the first and second rollers, and wherein the rollers can force the stem through the head until a floral material of the plant is removed from the stem by the stripping plate. In various such embodiments, the second roller is arranged at an angle with respect to the first roller, the angle being greater than 0 degrees and less than 90 degrees. In various such embodiments, the motor is arranged in the handle. In various such embodiments, the motor is a pneumatic vane motor. In various such embodiments, the handle includes a trigger operatively arranged to activate and deactivate the motor. In various such embodiments, the harvesting tool includes at least one gearbox connecting the motor to the first and second rollers. In various such embodiments, the at least one gearbox includes an input drive gearbox connected to the motor and a counter rotational gearbox connected to the input drive gearbox, the first and second rollers being connected to the counter rotational gearbox. In various such embodiments, the handle further comprises a muffler.

It should be appreciated from the above that various embodiments of the present disclosure provide a harvesting tool including a handle, and a head fixedly secured to the handle, the head arranged substantially perpendicular to the handle and including a first blade portion, and a second blade portion, wherein the second blade portion is connected to and arranged at an angle with respect to the first blade portion, the angle being greater than 0 degrees and less than 90 degrees. In various such embodiments, the head includes a stripping plate, a slot arranged in the stripping plate, a first roller arranged on a first side of the slot, a second roller arranged on a second side of the slot and spaced apart from the first roller, and a motor operatively arranged to drive the rollers, wherein a stem of a plant can engage the rollers such that the rollers force the stem therethrough until floral material is removed from the stem by the stripping plate.

Fourth Example Harvesting Device

Figure 11:
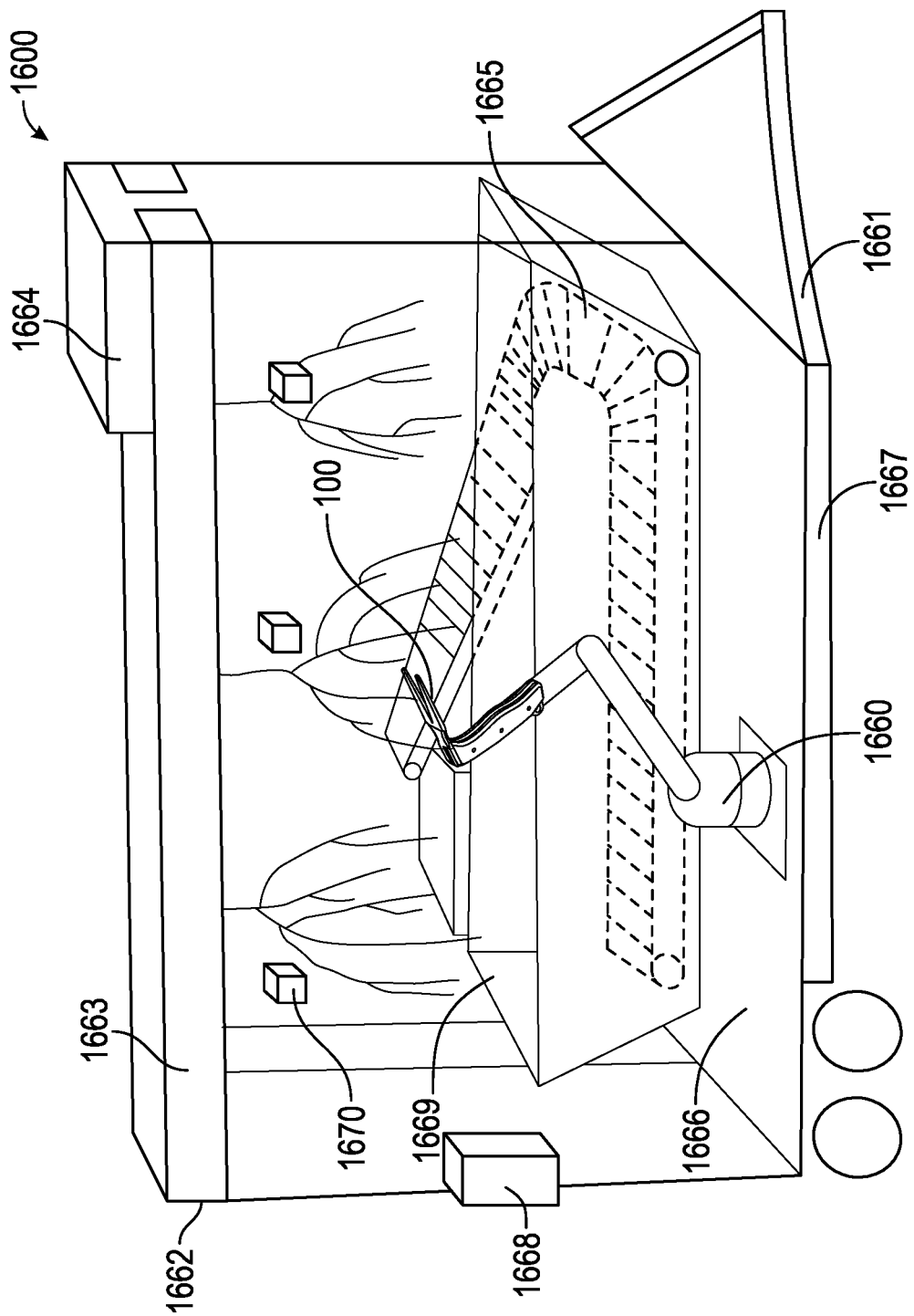
FIG. 11 is a perspective view of an automated harvesting workstation of one example embodiment of the present disclosure.
Figure 12:
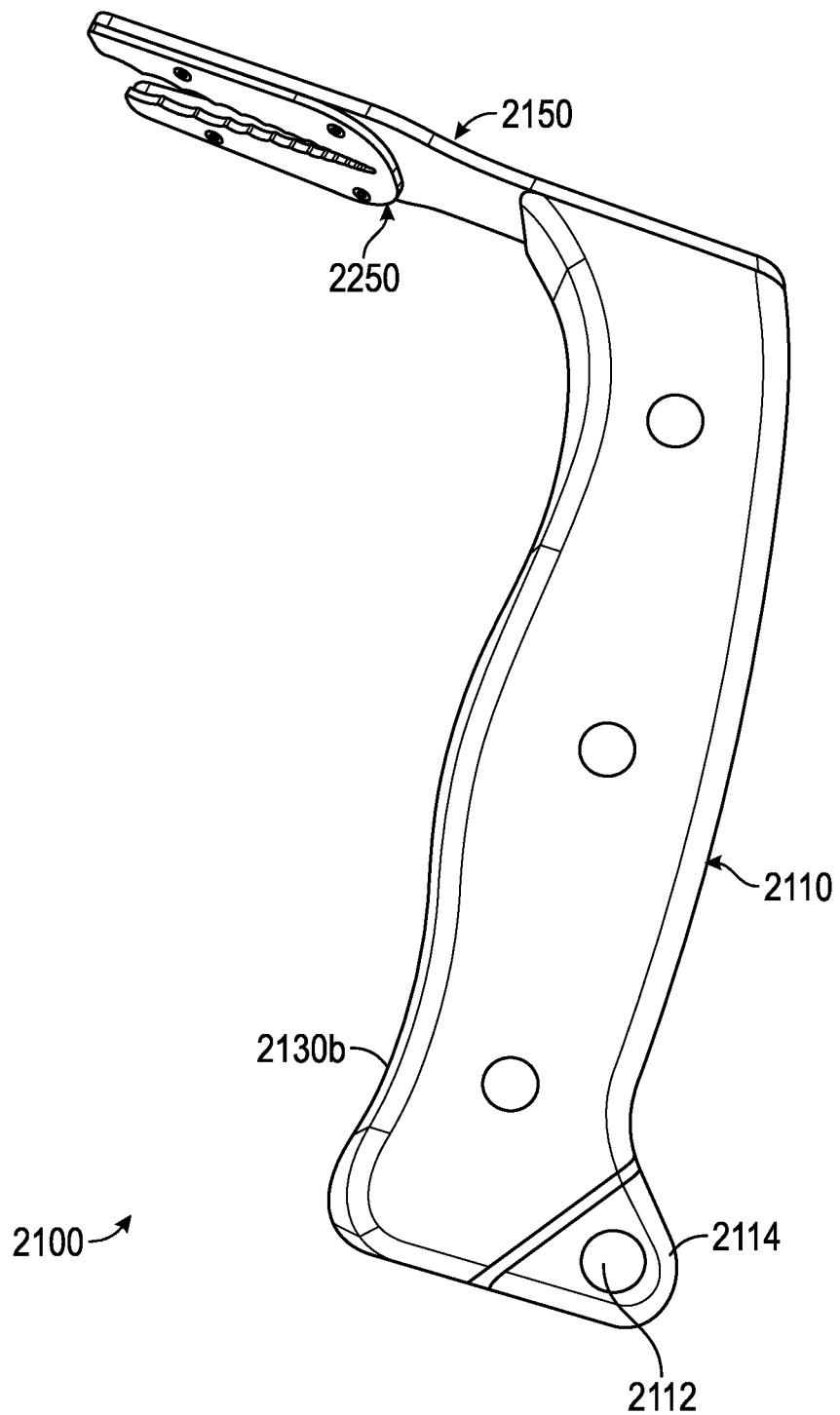
FIG. 12 is a side perspective view of a handheld harvesting tool of another example embodiment of the present disclosure.
Figure 13:
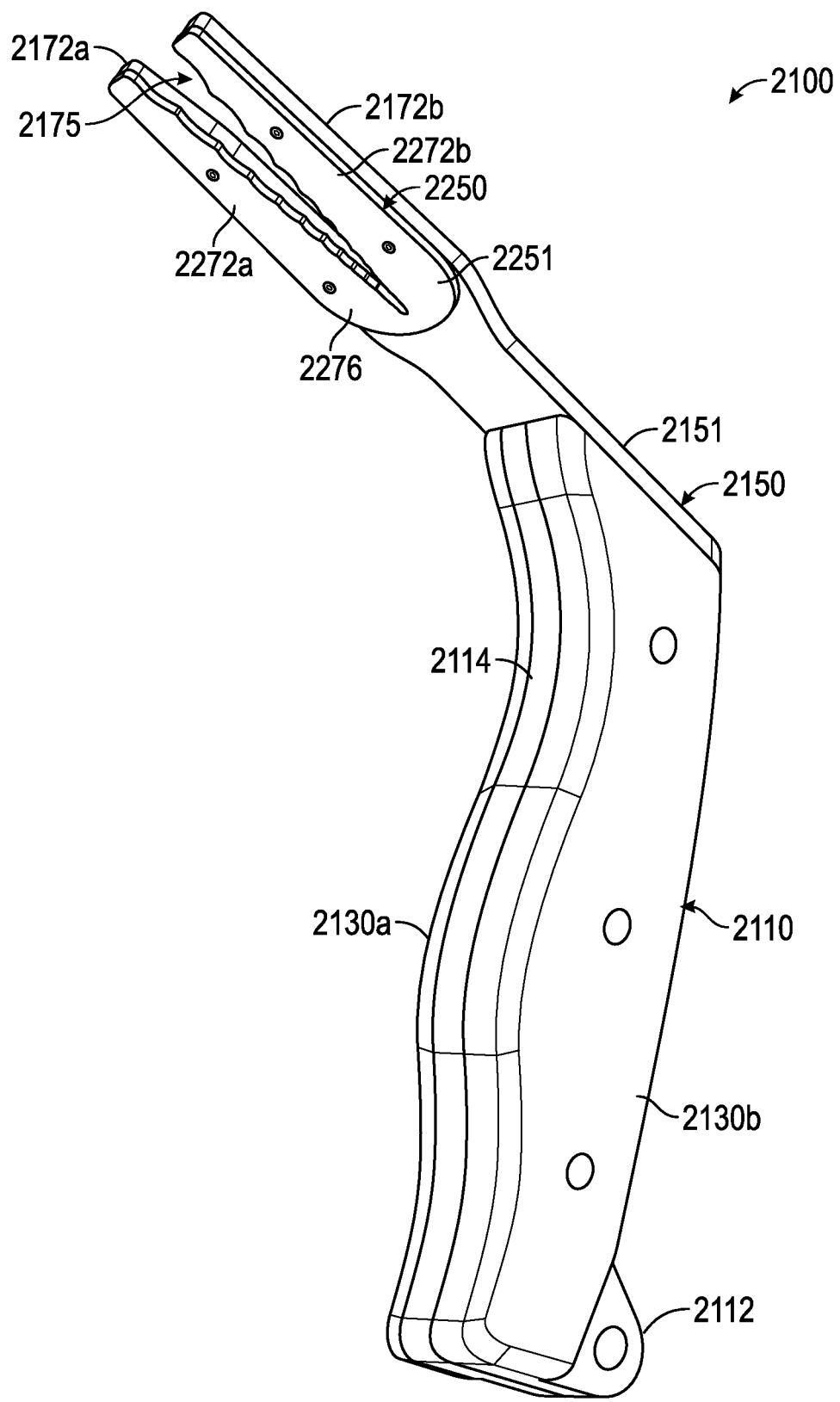
FIG. 13 is a bottom perspective view of the handheld harvesting tool of FIG. 12.
Figure 14A:
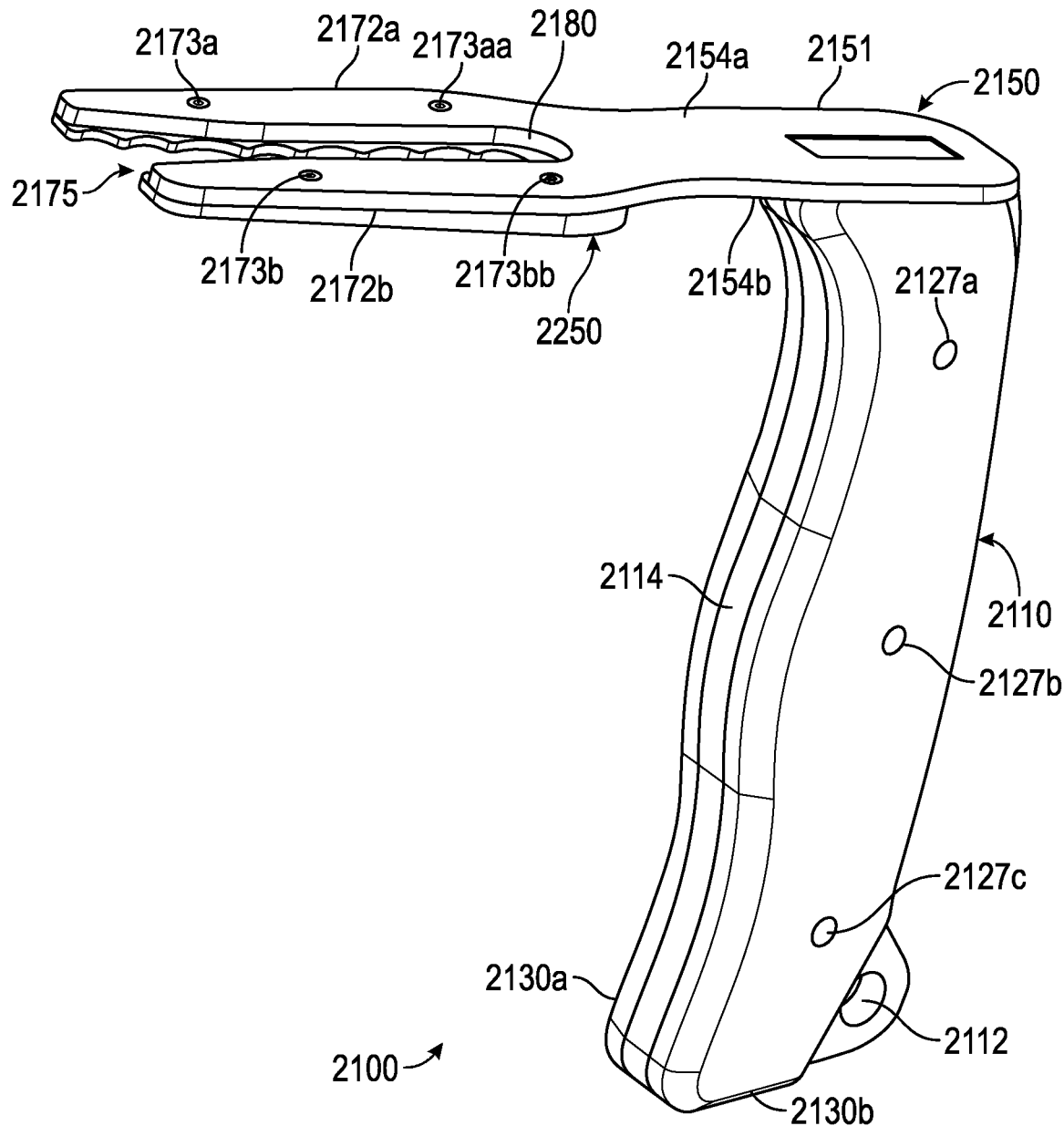
FIG. 14A is a side perspective view of the handheld harvesting tool of FIG. 12.
Figure 14B:
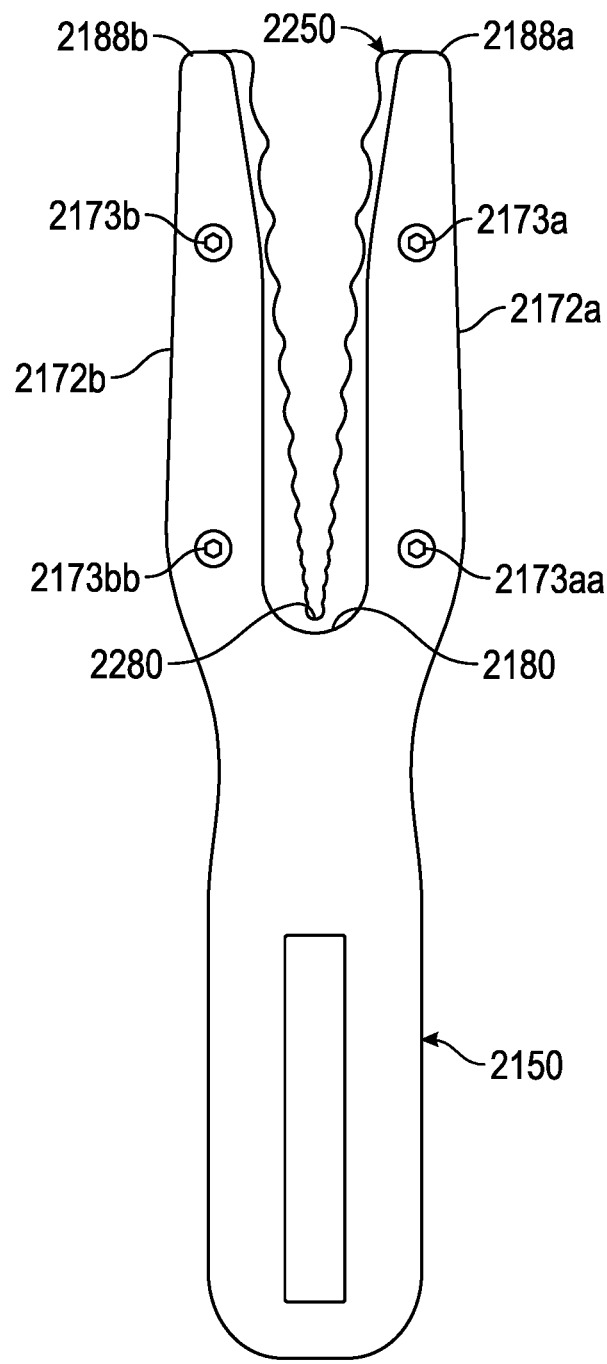
FIG. 14B is a top view of the handheld harvesting tool of FIG. 12.
Figure 14C:
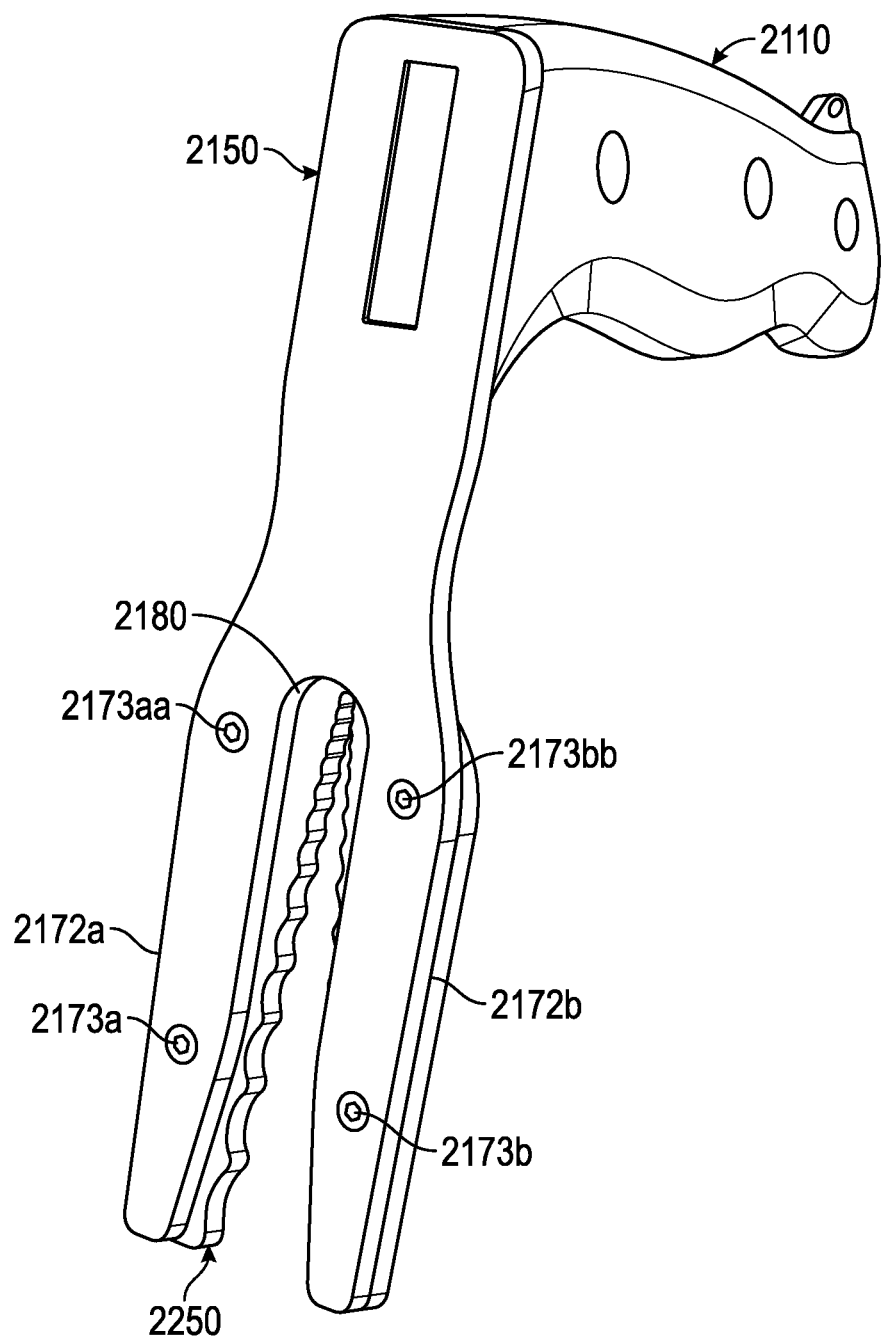
FIG. 14C is a top perspective view of the handheld harvesting tool of FIG. 12.
Figure 15:
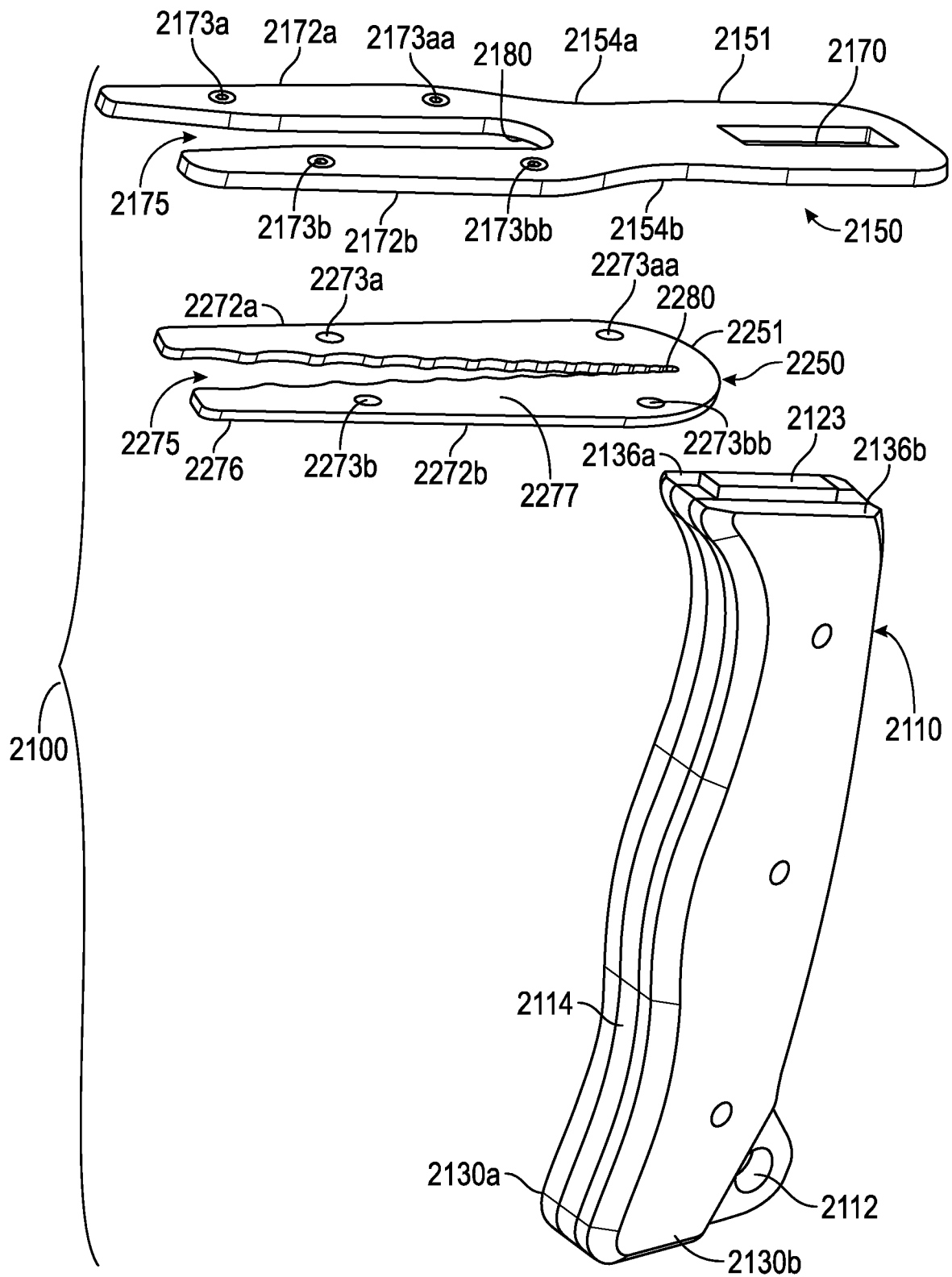
FIG. 15 is an exploded perspective view of the handheld harvesting tool of FIG. 12.
Figure 16:
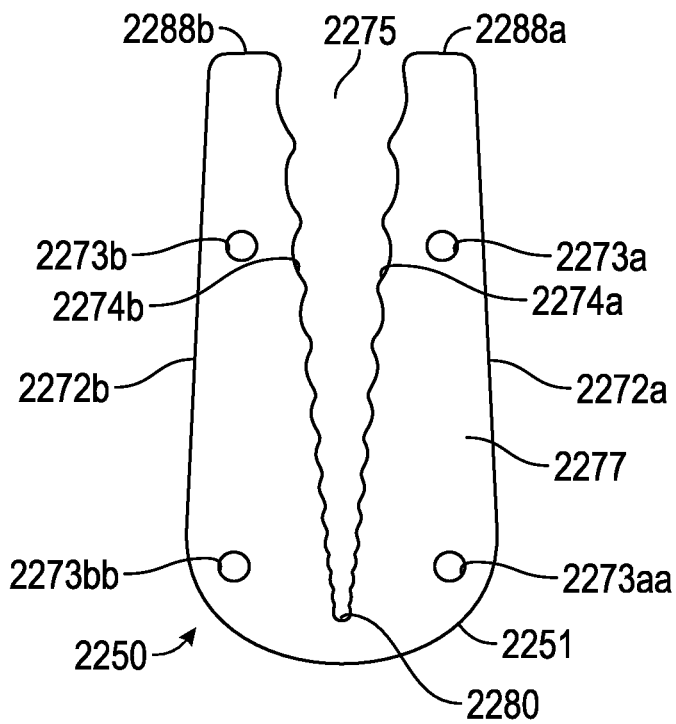
FIG. 16 is top view of the removable blade of the handheld harvesting tool of FIG. 12, the bottom view being a mirror image thereof.
Figure 17:
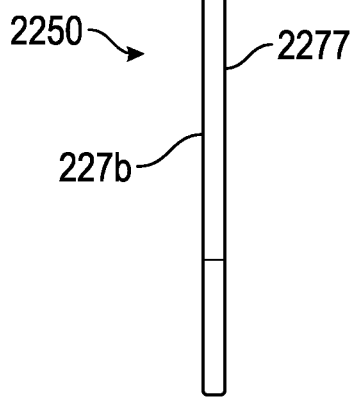
FIG. 17 is side view of the blade of the handheld harvesting tool of FIG. 12, the opposite side view being a mirror image thereof.
Figure 18A:
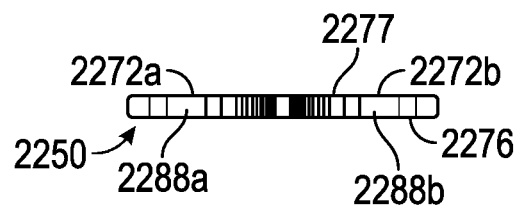
FIG. 18A is front end view of the blade of the handheld harvesting tool of FIG. 12.
Figure 18B:
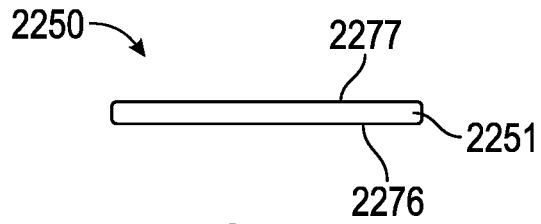
FIG. 18B is rear end view of the blade of the handheld harvesting tool of FIG. 12.

Turning now to FIG. 11, a harvesting device in the form of a harvesting tool of another example embodiment of the present disclosure is illustrated. This example harvesting tool is in the form of a mobile workstation 1600 that can include one or more other harvesting tools such as the example harvesting tools 100 or 1001 described above or the example harvesting tool 2100 described below. This example workstation 1600 is built onto a flatbed trailer 1661 with an optional power source such as on-board lithium-ion battery pack 1667. This workstation 1600 can be transported and brought into the field of production. This workstation 1600 includes a drive assembly such as including a chain drive 1663 that has an infeed 1662 at the back of the work workstation 1600. The work workstation 1600 includes a trough collection tub 1669 and conveyor 1665 that work to remove stripped floral material, and transfer the stripped floral material to a collection area such as a tote (not shown). A user platform 1666 spans from the front to the back of the trailer 1661 enabling one or multiple users to buck a *cannabis* plant as the *cannabis* plant moves past.

In various such embodiments, one or more of the users can be been replaced by a robotic arm such as a 6-axis robotic arm 1660. In certain of these embodiments, the act of selecting a stem is performed by a vision system 1670. The robotic arm 1660 can be securely fixtured in one place, or movable back and forth on the workstation 1600 such as parallel to the inverted *cannabis* plants. The workstation 1600 can include one or more cameras, lighting, a specific background behind the *cannabis* plants, and filters for the lenses to be able to capture sufficient data to make spatial calculations for the robot. The workstation 1600 can also include one or more wide and/or narrow wide field of view lenses, or one or more high resolution digital cameras, and/or other apparatus that assist in capturing images of the *cannabis* plants, plant stems, and/or floral material components. The information from these images can be processed on an onboard computer (or computer of the digital camera(s)), and then sent via a suitable communication network such as an ethernet. The signal from the camera array can be sent first to a PLC, where a custom code is used to process the image data. From the PLC, specific targets can be sent to the robotic control unit, which calculates the necessary joint angle rotations, and velocity vectors to accomplish a stripping profile. This control hardware along with a VFD (also controlled by the plc) can be inside enclosure 1664. The hardware is connected via an ethernet signal, and the appropriate position vector is similarly sent to the robotic arm 1660. A user HMI 1668 enables modifying the drive speed or control various parameters of the robot's performance.

It should also be appreciated that the mobile workstation 1600 can be otherwise suitably configured, shaped, and sized in accordance with the present disclosure.

Fifth Example Harvesting Device

Turning now to FIGS. 12, 13, 14A, 14B, 14C, 15, 16, 17, 18, and 19, a harvesting device in the form of a non-powered handheld harvesting tool 2100 of another example embodiment of the present disclosure is illustrated. This handheld harvesting tool 2100 generally includes a grip 2110, a blade support 2150 connected to the grip 2110, and a blade 2250 removably connectable to the blade support 2150 (by a plurality of fasteners). In this example embodiment, the blade 2250 is configured to be removed and replaced with a replacement blade (that is identical or similar to blade 2250) if the blade 2250 is damaged (such as broken), is worn out (or becomes dull), and/or accumulates too much sticky material from bucking *cannabis* plants. In this example embodiment, the blade 2250 is supported by the blade support 2150, and thus the grip 2110 supports the blade support 2150 and the blade 2250.

In this illustrated example embodiment, the grip 2110 is identical or similar to grip 110. Specifically, the grip 2110 includes a metal handle 2114 that can include one or more cutouts (not shown) to reduce the weight of the handle 2114. The handle 2114 is the main structural component upon which, at an obtuse angle the metal blade support 2150 is connected and specifically welded. The shape of the handle 2114 is slightly bowed in the back, and has two valleys in the front such to securely and comfortably fit in a user's hand. The grip 2110 includes plastic or rubber pads 2130*a* and 2130*b* that mimic the shape of the handle 2114 and are securely fixed to the handle 2114 with an epoxy adhesive and dowel pins 2127*a*, 2127*b*, and 2127*c*. The pads 2130*a* and 2130*b* each have chamfers around their respective exterior edges (not labeled). The chamfers do not extend along the top edges 2136*a* or 2136*b*, which are configured to form a flush mate with the bottom surface of the blade support 2150. The top of the handle 2114 defines two cutouts (not labeled) that leave a rectangular tab 2123 remaining. The tab 2123, which is slightly shorter than the thickness of the blade support 2150, fits into the matching hole 2170 in the blade support 2150. When fit into hole 2170, the difference in the height of the tab 2123 and the thickness of the blade support creates a weld pool recess for seamless fastening. Welded together, the grip 2110 is permanently fixed to the blade support 2150 at an obtuse angle in this example embodiment to mitigate interaction of the user's hand and the floral material. In this example embodiment, the tool 2100 and specifically the handle 2114 defines a small hole 2112 in the bottom rear of the handle 2114 such that a wrist strap (not shown) can be employed with the tool 2100. The wrist strap enables the quick release of the tool 2100 to free both hands of a user, and then enables the user to quickly regrip the tool 2100. In this example embodiment, the handle 2114 is made from a suitable metal material; however, it should be appreciated that the handle 2114 can be made from other suitable materials in accordance with the present disclosure. It should also be appreciated that the handle 2114 can be otherwise suitably configured, shaped, and sized in accordance with the present disclosure.

It should further be appreciated that this example illustrated grip 2110 is only one example grip and that any other suitable grip can be employed for the harvesting tools of the present disclosure. In various other embodiments, the grip is formed of different sizes, shapes, and/or components. In various other embodiments, the grip is otherwise suitably connected to the blade support. In various other embodiments, the mounting end of the blade support is otherwise suitably configured for attachment to an otherwise formed grip.

The blade support 2150, which is made from metal in this example embodiment, includes a mounting end 2151 and two blade support fingers 2172a and 2172b connected to and extending from the mounting end 2151. The blade support 2150 extends outwardly at an obtuse angle from the grip 2110 and is parallel to the ground (when the tool 2100 is held in an upright position such as shown in FIG. 14). In other embodiments, the blade support 2150 can extend outwardly at a different angle such as at a right angle from the grip 2110. In other embodiments, the grip and/or the blade support 2150 can have one or more additional bends enable the user's hand position to be at a maximized spaced apart position away from the floral material that the harvesting tool will be used to buck.

The mounting end 2151 of the blade support 2150 includes opposite side surfaces that define cutouts 2154a and 2154b that provide an alternative top gripping area of the blade support 2150 that can reduce user fatigue and improve use of the harvesting tool 2100. In alternative embodiments, these cutouts are of different shapes, and in further alternative embodiments, the blade support 2150 does not include such cutouts, and thus it should be appreciated that the blade support can be alternatively configured.

The blade support fingers 2172a and 2172b define a U-shaped channel 2175 that has a curved apex 2180 (that is partially semi-circular). The channel 2175 can vary in shape in other embodiments of the present disclosure. The blade support fingers 2172a and 2172b and the U-shaped channel provide sufficient distance between the two fingers 2172a and 2172b to enable a user to use one or more of the user's fingers or a suitable tool to removal any stuck floral material on the top or inner portions of the blade 2250 or inner portions of the fingers 2172a and 2172b of the blade support 2150.

The U-shaped channel 2175 is defined by inner transverse (such as vertical) surfaces of the blade support fingers 2172a and 2172b that face each other. In this example embodiment, the distal ends of the blade support 2150 and specifically of the blade support fingers 2172a and 2172b have curved end edges 2188a and 2188b. The width of the opening at the end of the U-shaped channel 2175 is greater than the width at the apex 2180, such that a user can easily insert a selected stem of a *cannabis* plant into the U-shaped channel 2175. In this embodiment, the U-shaped channel is tapered wider toward the ends 2188a and 2188b to facilitate receipt of different size stems and to provide access to the wider end portions of the blade 2250 through the U-shaped channel for inspection and cleaning purposes.

In various embodiment, the relative sizes of the U-shaped channel and the blade support 2150 as compared to the V-shaped channel (further described below) and the blade 2250 can provide different levels of direct support to the blade 2250. For example, the cutting edges of a relatively thin blade may bend under certain bucking conditions in part because they are not directly supported by the fingers of the blade support 2150.

The blade support fingers 2172a and 2172b define four spaced apart interior fastener receiving openings (not shown or labeled) that extend between the top and bottom surfaces of the blade support fingers 2172a and 2172b. The interior fastener receiving openings (not labeled) are configured to receive four separate fasteners 2173a, 2173aa, 2173b, and 2173bb that removably connect the blade 2250 to the blade support fingers 2172a and 2172b and thus the blade support 2150. In this example embodiment, the top surfaces of the blade support fingers 2172a and 2172b have counterbored opening shaped and sized to receive the heads of the fasteners (such as the bolts) when the fasteners are respectively inserted through the blade support fingers 2172a and 2172b into threaded holes in the blade 2250 to removably by securely attach the blade 2250 to the blade support 2150. In this example embodiment, the fasteners are shaped and sized such the bottom ends of the fasteners are flush with the bottom surface of the blade 2250 to provide a seamless cutting surface.

It should be appreciated that the present disclosure contemplates that other suitable mechanisms (other than fasteners can be employed) to removably connect the blade to the blade support. For example, in various embodiments, the blade support can define a channel into which the blade is removably inserted. In other example embodiments, a suitable adhesive is employed to removably attach the blade to the blade support. In other example embodiments, the blade can be snapped onto and off of the blade support.

In this example embodiment, the blade support 2150 is made from a suitable stainless steel metal material; however, it should be appreciated that the blade support 2150 can be made from other suitable materials in accordance with the present disclosure. In this example embodiment, the mounting end 2151 and two blade support fingers 2172a and 2172b are monolithically formed. The present disclosure contemplates variations to the blade cupping can be made such that the performance of the blade can be improved for wet or dry bucking. It should also be appreciated that the blade support 2150 can be otherwise suitably configured, shaped, and sized in accordance with the present disclosure.

The replaceable blade 2250 has a somewhat similar shape as the front portion of the blade support 2150 and particularly the blade support fingers 2172a and 2172b. The blade 2250, which is made from metal in this example embodiment, includes a base 2251 and two cutting fingers 2272a and 2272b connected to and extending from the base 2251. Since the blade 2250 is removably connected to the blade support 2150, the blade 2250 (when connected to the blade support 2150) also extends outwardly at an obtuse angle from the grip 2110 and is parallel to the ground (when the tool 2100 is held in an upright position such as shown in FIG. 14). However, in alternative embodiments, if the blade support is at a different angle relative to the grip, the blade will be at that angle. In further alternative embodiments, the blade support or the blade can have a varying thickness that can be used to adjust such angles.

The cutting fingers 2272a and 2272b of the blade 2250 define a V-shaped channel 2275 that has a curved apex 2280. The cutting fingers 2272a and 2172b also include somewhat rounded ends 2288a and 2288b that form the end of the V-shaped channel 2275. The V-shaped channel 2275 is of a relatively narrow angle in various embodiments of the present disclosure, and is approximately 10 degrees in this illustrated example embodiment. The width of the opening at the end of the V-shaped channel 2275 is significantly greater than the width at the apex 2280, such that a user can easily insert a stem of a *cannabis* plant in the V-shaped channel 2275. The cutting fingers 2272a and 2272b include inner edges 2274a and 2274b that face each other and that define the V-shaped channel 2275. In this example embodiment, the inner edges 2274a and 2274b each include a plurality of increasing diameter arced surfaces (not individually labeled) that define opposing pairs of cutouts along the length of and that define the channel 2275. These arced (or filleted) surfaces or edges along the length of the channel 2275 increase the effective blade length and thus provide a larger interaction area around part of a stem to reduce overall pressure on the floral material of the *cannabis* plant. These surface or edges can also reduce fibrous hairs from separating from the stem during bucking. It should further be appreciated that as shown in FIGS. 13, 14A, 14B, 14C, 15, and 16, the arced cutting edge surfaces of the cutting fingers 2272a and 2272b have curved innermost edges or apexes between each pair of respective arc (instead of pointed edges) to reduce damage to the floral material and to provide less cutting into the stems. It should further be appreciated that as shown in FIGS. 13, 14A, 14B, 14C, 15, and 16, one of the respective different pairs of arced cutting edge surfaces of the cutting fingers 2272a and 2272b will be more likely to mate with opposite outer surfaces of a stem depending on the size of the stem. This matting can provide a more desired clean shearing action on the stem. It should further be appreciated the respective pairs of arced cutting edge surfaces of the cutting fingers 2272a and 2272b that engage the stem can change during the bucking of a stem as that stem become more narrow during the bucking process. It should further be appreciated that the user can angle or articulate the tool 2100 differently to maximize change the position of the cutting edges of the blade 2250 relative to the stem and to maximize the desired shearing action on the stem.

One advantage of the removable blade is to provide a sufficiently thin cutting blade while enabling the blade support to reduce the deflection angles of the blade and specifically the cutting face of the blade. It should be appreciated that the cutting faces of the blade can in other embodiments be at one or more angles other than perpendicular (such as at 45 degrees relative to one another). For example, in various such embodiments, the cutting faces can be trapezoidal with the wider surfaces at the bottom. In various embodiments, the arced cutting surfaces of the blade are laser cut or cut by a waterjet. In various embodiments, the arced cutting surfaces of the blade decrease in width from the apex to the ends. In various embodiments, the arced cutting surfaces of the blade increase in width from the apex to the ends. In various embodiments, the arced cutting surfaces of the blade each have the same width from the apex to the ends. In various embodiments, the arced cutting surfaces of the blade increase in width from the apex to the ends.

The cutting fingers 2272a and 2272b define four spaced apart interior threaded fastener receiving openings 2273a, 2273aa, 2273b, and 2273bb that respectively extend through the cutting fingers 2272a and 2272b (i.e., from the bottom surface 2276 to the top surface 2277) such as described above. The interior threaded fastener receiving openings 2273a, 2273aa, 2273b, and 2273bb are configured to receive four separate fasteners 2173a, 2173aa, 2173b, and 2173bb that removably connect the blade 2250 to the blade support fingers 2172a and 2172b and thus the blade support 2150 such as described above. It should be appreciated that, in use, the downward movement of the tool 2100 will not place undue stress on the fastener against the securement of the bade 2250 to the blade support 2150.

As best illustrated in FIGS. 13, 14A, 14B, and 14C, and as mentioned above, the respective fingers that define the widths and shapes of the U-shaped channel of the blade support 2150 and V-shaped channel of the blade 2250 have different shapes and widths to provide access to the blade 2250 through the blade support 2150 for cleaning purposes. In other words, this provides for less buildup of floral material and easier removal of stuck material. Additionally, as indicated above, these different shapes and widths provide access to the blade 2250 through the blade support 2150, in certain circumstances, can enable a small amount of flexing of the directly unsupported inner cutting edges of the blade 2250 depending on the strength and/or thickness of the blade to provide a more delicate interaction with the floral material of the *cannabis* plant). Additionally, as indicated above, these different shapes and widths enable a user to see the blade and the cutting edges thereof to determine if the blade is damaged (without having to turn the tool upside down). It should be appreciated that the U-shaped channel of the blade support 2150 and V-shaped channel of the blade 2250 are suitably aligned to provide this access.

The opening of the V-shaped channel in the blade 2250 is wide enough to provide for easy insertion of the tool 2100 onto a stem of a *cannabis* plant. This enables the tool 2100 to be used to apply the necessary downward force to strip floral material from the stem as explained above for the other harvesting tools. It should be appreciated that the flat bottom areas of the fingers of the blade 2250 provide a flat area that can engage formal material of a *cannabis* plant to spread out forces applied against such formal material to limit damage to that floral material.

In this example embodiment, the blade 2250 is made from a suitable metal material; however, it should be appreciated that the blade 2250 can be made from other suitable materials in accordance with the present disclosure. In this example embodiment, the blade 2250 is monolithically formed. In this example embodiment, the thickness of the blade 2250 is approximately 0.048 inches. It should also be appreciated that the blade 2250 can be otherwise suitably configured, shaped, and sized in accordance with the present disclosure. The shape, size, thickness, and/or material of the blade and thus each of the cutting fingers of the blade can vary in accordance with the present disclosure.

It should be appreciated that the respective U-shaped channel and the V-shaped channel can be modified such that the angle of the channel and the length of the blade are optimized to meet the needs of larger or smaller diameter plant stems. Various embodiments of the present disclosure can includes a small diameter stem harvesting tool and a large diameter stem harvesting tool, such that the users can work in tandem to respectively remove floral material more effectively. This can also be useful when a whole *cannabis* plant is gripped from above, and moved linearly with respect to multiple users such that the *cannabis* plant can be selectively bucked into multiple groups based on qualities (such as A, B, and C qualities, etc).

Sixth Example Harvesting Device

Turning now to the FIGS. 19, 20, 21, 22, 23, 24, 25, 26, 27, and 28 another example harvesting device in the form of a harvesting workstation 2500 of one example embodiment of the present disclosure is illustrated. This example harvesting workstation 2500 includes a gripper 2600 supported by a stand 2900. The gripper 2600 is configured to be operated by a user to grip and support a stem of a *cannabis* plant above a collection plate (not shown) or other collection device (not shown). For example, FIG. 27 generally illustrates a gripper 2600 of the harvesting workstation 2500 gripping of a stem 8 of a *cannabis* plant 5 in preparation for stripping the floral material (not shown in FIG. 27) from the stem 8 of the *cannabis* plant 5.

The gripper 2600 generally includes a base 2610, a repositionable first stem engager 2630 connected to the base 2610, a second stem engager 2660 pivotably connected to the base 2610, a handle 2690 connected to the second stem engager 2660, and a biasing member 2680 that biases the second stem engager 2660 and the handle 2690 to respective retracted positions and thus to the stem engagement positions as discussed below.

More specifically, the base 2610 includes a generally flat plate that has a first stem engager support section 2612, a second stem engager support section 2618, and a supporting arm attachment section 2620. The first stem engager support section 2612 is configured to support the first stem engager 2630 in a plurality of different positions that are different distances from the second stem engager 2660 to enable the gripper 2600 to grip stems of substantially different sizes. The first stem engager support section 2612 defines a horizontally extending locking pin receiving slot 2613 and four pairs of vertically spaced apart upper and lower positioning pin receiver openings 2614a, 2614b, 2614c, 2614d, 2614e, 2614f, 2614g, and 2614h. The second stem engager support section 2618 is configured to support the second stem engager 2660 to enable the second stem engager 2660 to pivot from retracted positions to extended positions and back to the retracted positions. The second stem engager support section 2618 defines a pivot member receiving opening (not shown or labeled) through which a pivot member of the second stem engager 2660 extends and in which the pivot member can pivot. The arm support section 2620 extends upwardly from the first stem engager support section 2612 and the second stem engager support section 2618 and provides an area for attachment of the arm support 2910 of the stand 2900.

The first stem engager 2630 includes a first bearing 2632 having an inner stem engagement face or plate 2634 that has a plurality of elongated gripping teeth 2636. The first bearing 2632 can be made from a single member or from multiple attached members. The first stem engager 2630 further includes a locking pin 2638 extending from a rear surface (not labeled) of the first bearing 2632, an upper positioning pin 2640 extending from the rear surface of the first bearing 2632 above the locking pin 2638, and a lower positioning pin 2642 extending from the rear surface of the first bearing 2632 below the locking pin 2638. The first stem engager 2630 further includes a locking pin securer which in this example embodiment includes a washer 2644 journaled about the locking pin 2638 and configured to engage the rear surface (not labeled) of the base 2610, a lock washer 2646 attached to the distal free end of the locking pin 2638, and a biasing member such as spring 2648 journaled about the locking pin 2638 and extending between and abutting the washers 2644 and 2646. The spring 2648 is configured to apply a biasing force to push the washer 2644 toward the first bearing 2632.

The first stem engager 2630 is thus securely attachable to the base 2610 at any of four different positions in this illustrated example embodiment. In the first position shown in the Figures, the first stem engager 2630 is closest to the second stem engager 2660. In this first position, the upper positioning pin 2640 extends into the upper positioning pin receiver opening 2614a, the lower positioning pin 2642 extends into the lower positioning pin receiver opening 2614b, and the locking pin 2638 extends through and out of the horizontally extending locking pin receiving slot 2613. Additionally, in this first position, the washer 2644, the lock washer 2646, and the spring 2648 co-act to apply pressure to secure the first stem engager 2630 in this position. If the user desires to move the first stem engager 2630 to a position that is further away from the second stem engager 2660, the user can pull the first bearing 2632 outwardly against the bias of the spring 2648 to cause the upper positioning pin 2640 to move out of the upper positioning pin receiver opening 2614a and the lower positioning pin 2642 to move out of the lower positioning pin receiver opening 2614b. The user can then slide the first stem engager 2630 to the left causing the locking pin 2638 thereof to move in the horizontally extending locking pin receiving slot 2613. The user can then position the upper positioning pin 2640 and the lower positioning pin 2642 in alignment with one of the other pairs of upper and lower positioning pin receiver openings 2614c and 2614d, 2614e and 2614f, or 2614g and 2614h. After such positioning, the user can then release the first bearing 2632, and the spring 2648 will cause the first stem engager 2630 to move inwardly such that the upper positioning pin 2640 and the lower positioning pin 2642 respectively extend into one of those pairs of upper and lower positioning pin receiver openings.

The second stem engager 2660 includes a second bearing 2662 having an inner stem engagement face or plate 2664 that has a plurality of elongated gripping teeth 2666. The second bearing 2662 can be made from a single member or from multiple attached members. In this illustrated example embodiment the inner stem engagement face or plate 2664 has a shape (based on a Fibonacci spiral) that provide for the point of engagement of the teeth 2666 of the second stem engager 2660 with the teeth 2636 of the first stem engager 2630 to remain at the same location relative to the first stem engager 2630 for different size stems. In this example embodiment, the closest points of engagement between the engagers 2630 and 2660 (when they are holding a stem) will be between the two teeth at the bottom of the first engager 2630 and a set of teeth of the second engager 2660 that will depend on the size of the stem. This enables a user to engage a stem with a short length of exposed stem. It should be appreciated that the inner stem engagement face or plate 2664 can vary in other embodiments of the present disclosure.

The second stem engager 2660 further includes a pivot 2668 extending from a rear surface (not labeled) of the second bearing 2662. The pivot 2668 extends through the pivot opening (not shown) in the base 2610. The gripper 2600 can include a stop pin 2678 (such as shown in FIGS. 19, 20, 22, 25, and 27) that prevents over rotation of the second stem engager 2660. In other embodiments, the gripper 2600 does not include such as stop pin 2678 that prevents over rotation of the second stem engager 2660, but can include a protrusion 2678 extending from the second bearing 2662 such as shown in FIG. 21. In other embodiments, the gripper 2600 does not include such stopping members but rather allows the handle to function as a stopping member for the rotation of the second stem engager 2660. In various embodiments, the second stem engager 2660 is secured on an axle and the handle 2640 is also secured to the axle.

Figure 26:
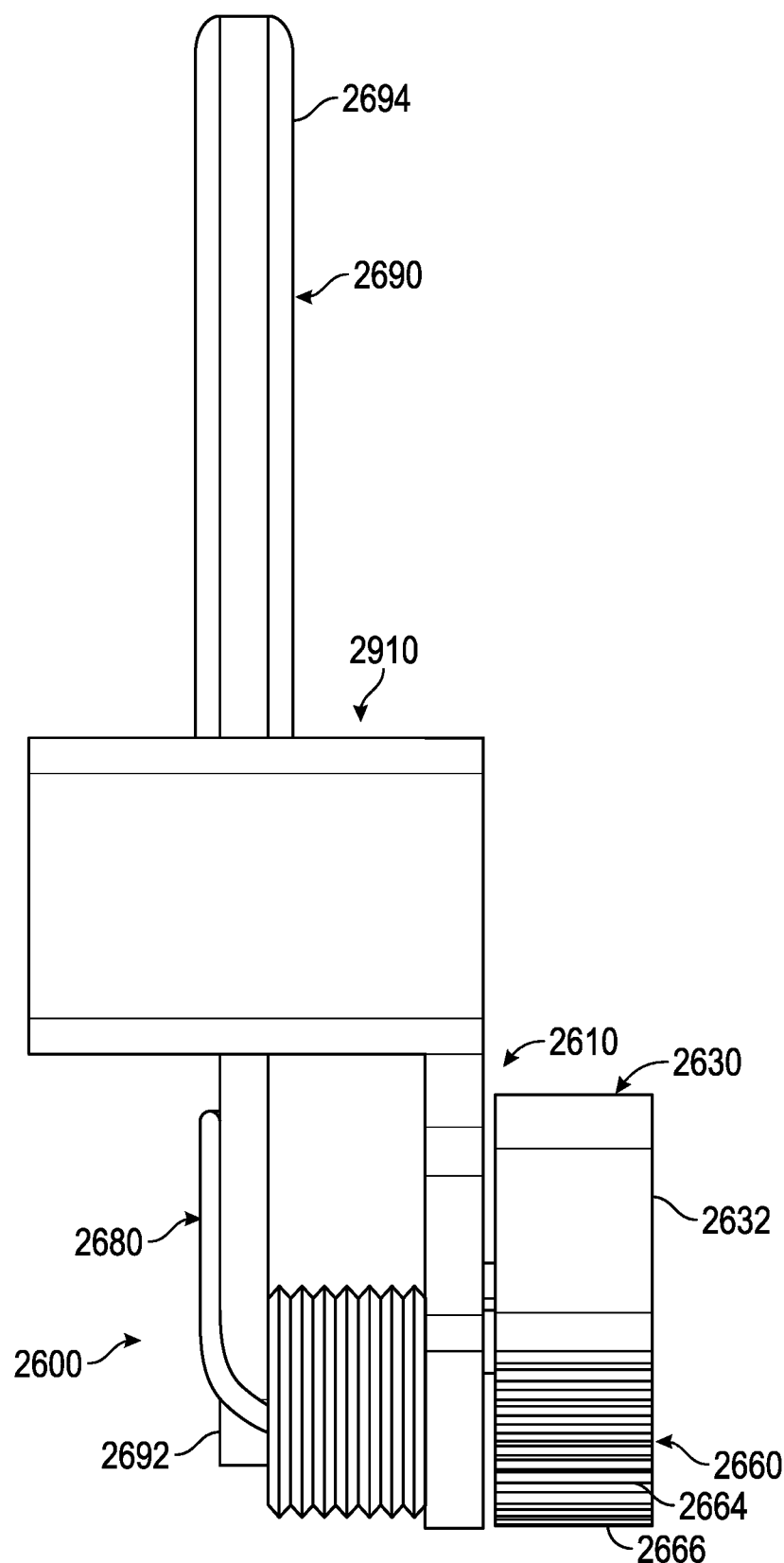
FIG. 26 is an enlarged fragmentary side view of the gripper of the harvesting workstation of FIG. 19.

It should be appreciated that the first and second bearing 2632 and 2662 can be flush against the base 2610 or can be slight spaced from the base 2610. For example, FIG. 26 shows a small space between the base 2610 and the second bearing 2662 which can facilitate rotation or pivoting of the second bearing 2662.

The handle 2690 includes a first end 2692 that is connected to the pivot 2668 of the second stem engager 2660 and a second end 2694 that is configured to be griped by the user and to be rotated in a clockwise direction (when facing the gripper) to pivot the second stem engager 2660 from the retracted position to the extended positions. The handle 2690 includes a biasing member attachment section 2696 configured such that one end of the biasing member 2680 can be attached to the handle 2690. The handle 2690 and the second stem engager 2660 are thus arranged such that torque can be transferred from the handle 2690 to the second stem engager 2660 and such that torque can be transferred from the second stem engager 2660 to the handle 2690. In various embodiments, the handle 2690 and the second stem engager 2660 have a keyed shaft connection. FIGS. 19, 20, 21, 22, and 27 show two different example overlapping positions for such a keyed shaft (not labeled). It should be appreciated that only one such position would be employed. It should further be appreciated that other connection members can be employed. Thus, in various embodiments, the handle 2690 and the second stem engager 2660 are permanently connected to each other (such as by welding). In various other embodiments, the handle 2690 and the second stem engager 2660 are configured to be disconnected from each other such as for cleaning.

The biasing member 2680 is in a form of a spring that is journaled about the pivot 2668 and extends between the rear surface of the base 2610 and the handle 2690. The spring 2680 is configured to apply a biasing force that biases the handle 2690 to its retracted position and the second engager 2660 to its retracted position.

Figure 27:
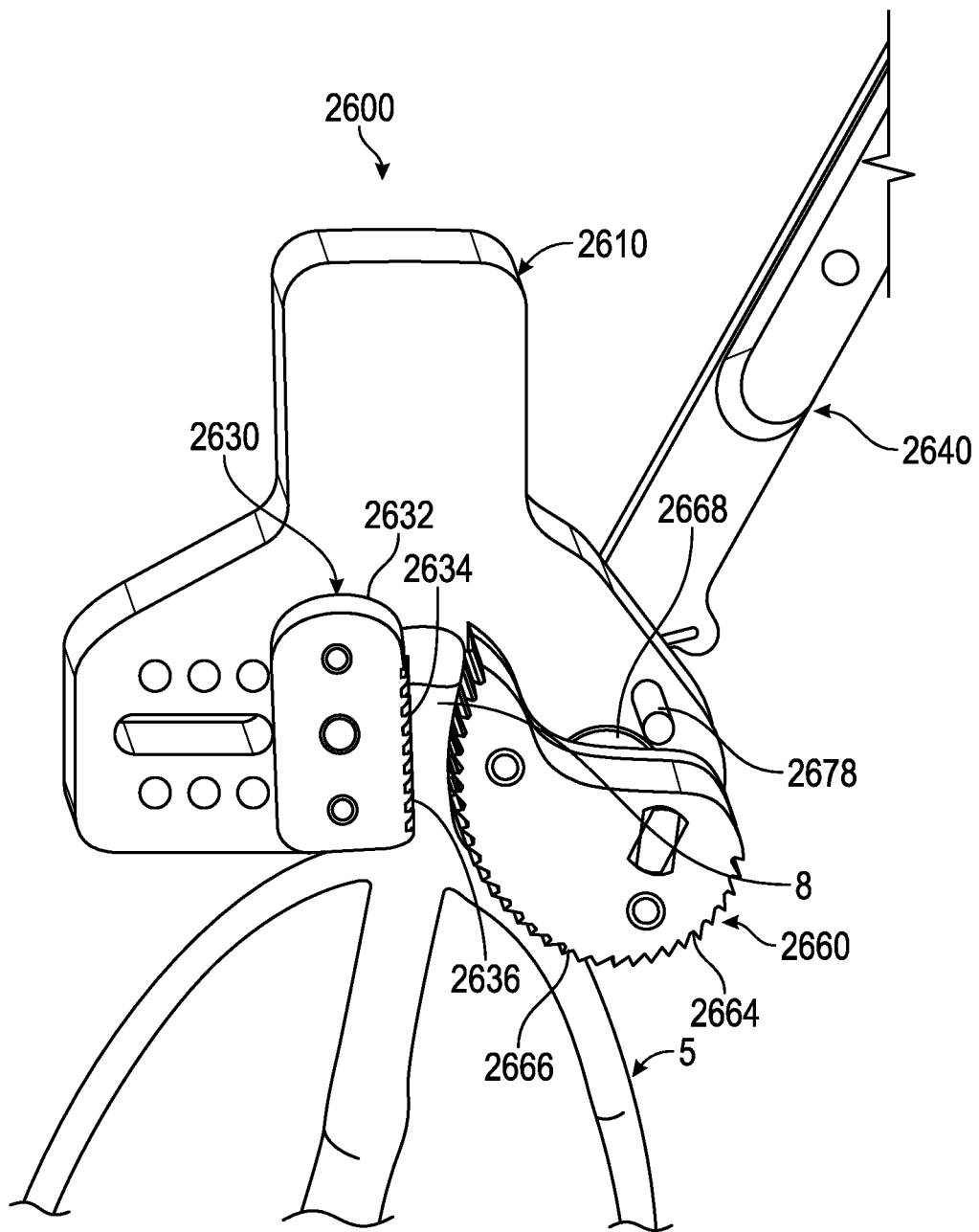
FIG. 27 is an enlarged fragmentary front perspective view of the gripper of the harvesting workstation of FIG. 19 shown gripping a stem of a *cannabis* plant.

The first stem engager 2630 and the second stem engager 2660 are configured to co-act to securely grip a stem as shown in FIG. 27. To do so, the handle 2690 is rotated clockwise (when facing the gripper 2600) by the user to move the second stem engager 2660 from a fully retracted position to any one of a plurality of different extended positions along a pivot path and thus provide room for the stem to be placed between the first stem engager 2630 and the second stem engager 2660. After the stem 8 is placed between the first stem engager 2630 and the second stem engager 2660, the user releases the handle 2690, and the spring 2680 causes the second stem engager 2660 (and the handle 2690) to pivot back toward the first stem engager 2630 and thus cause the respective gripping teeth 2636 and 2666 of the first stem engager 2630 and the second stem engager 2660 to respectively securely grip the stem 8. In this position, the user can use a harvesting tool (such as one of the harvesting tools 100, 1001, or 2100 disclosed herein) to remove the floral material from the stem 8 while the stem 8 is securely held by the gripper 2600. After the user removes the floral material from the stem 8, the user can release the stem 8 by rotating the handle 2690 clockwise (when facing the gripper 2600) to cause the first stem engager 2630 and the second stem engager 2660 to release the stem 8.

The gripper 2600 and specifically the base 2610, the repositionable first stem engager 2630, the second stem engager 2660, the handle 2690, and the biasing member 2680 are made from suitable metal materials; however, it should be appreciated that one or more of these components can be made from other suitable materials in accordance with the present disclosure. It should also be appreciated that the gripper 2600 can be otherwise suitably configured, shaped, and sized in accordance with the present disclosure.

Figure 19:
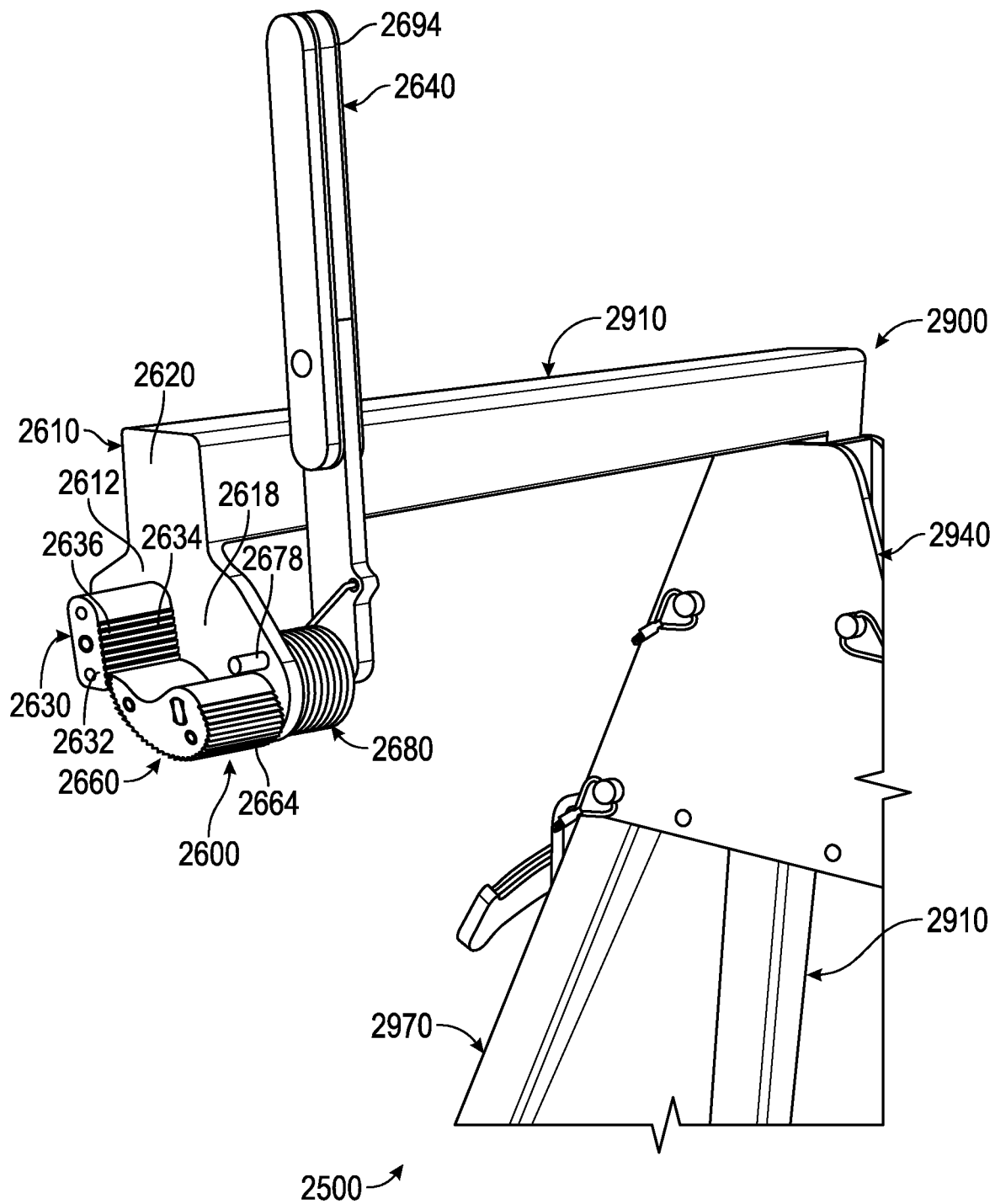
FIG. 19 is a fragmentary perspective view of a harvesting device in the form of a harvesting workstation of one example embodiment of the present disclosure.
Figure 20:
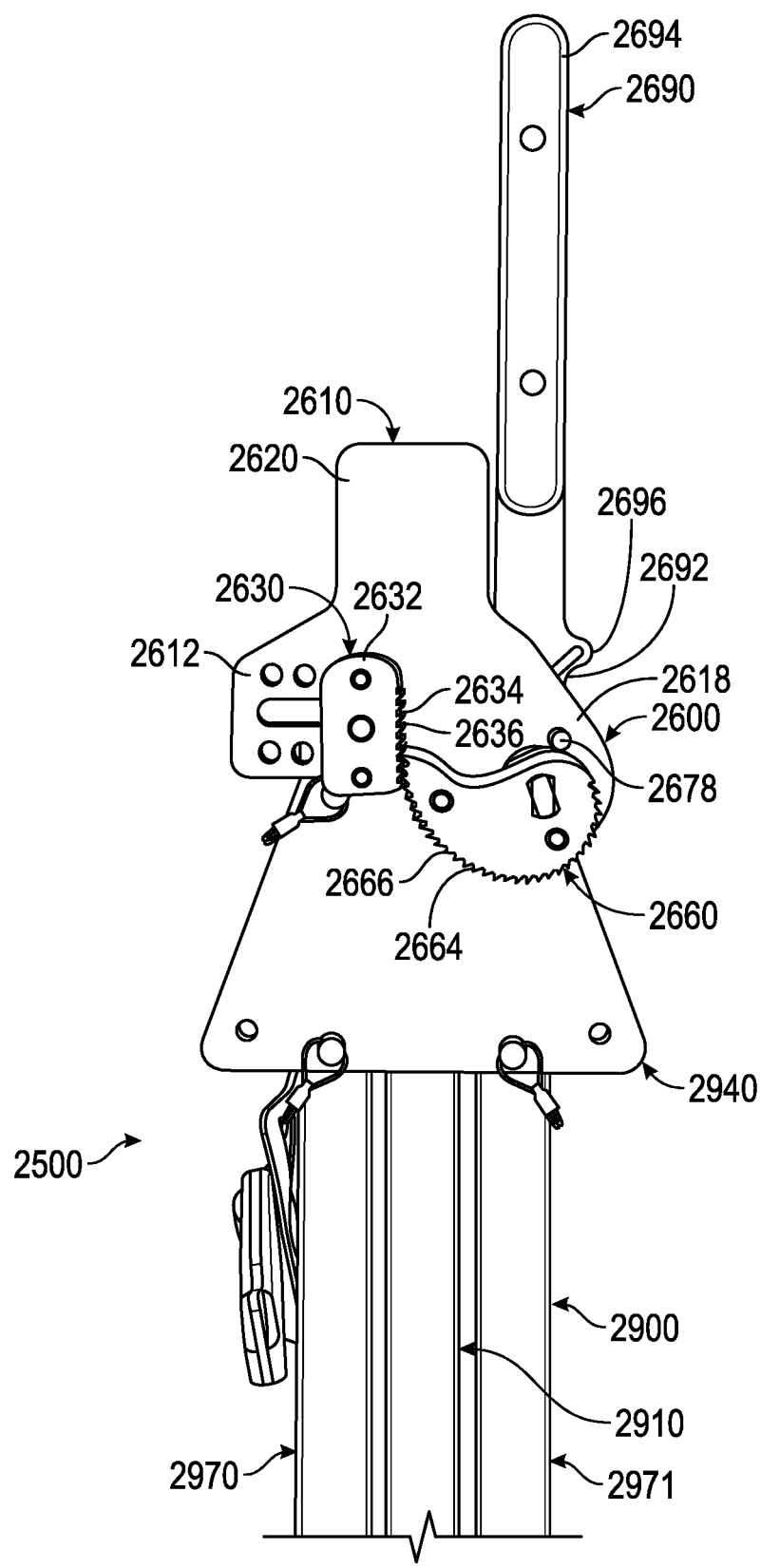
FIG. 20 is a fragmentary front view of the gripper of the harvesting workstation of FIG. 19.
Figure 21:
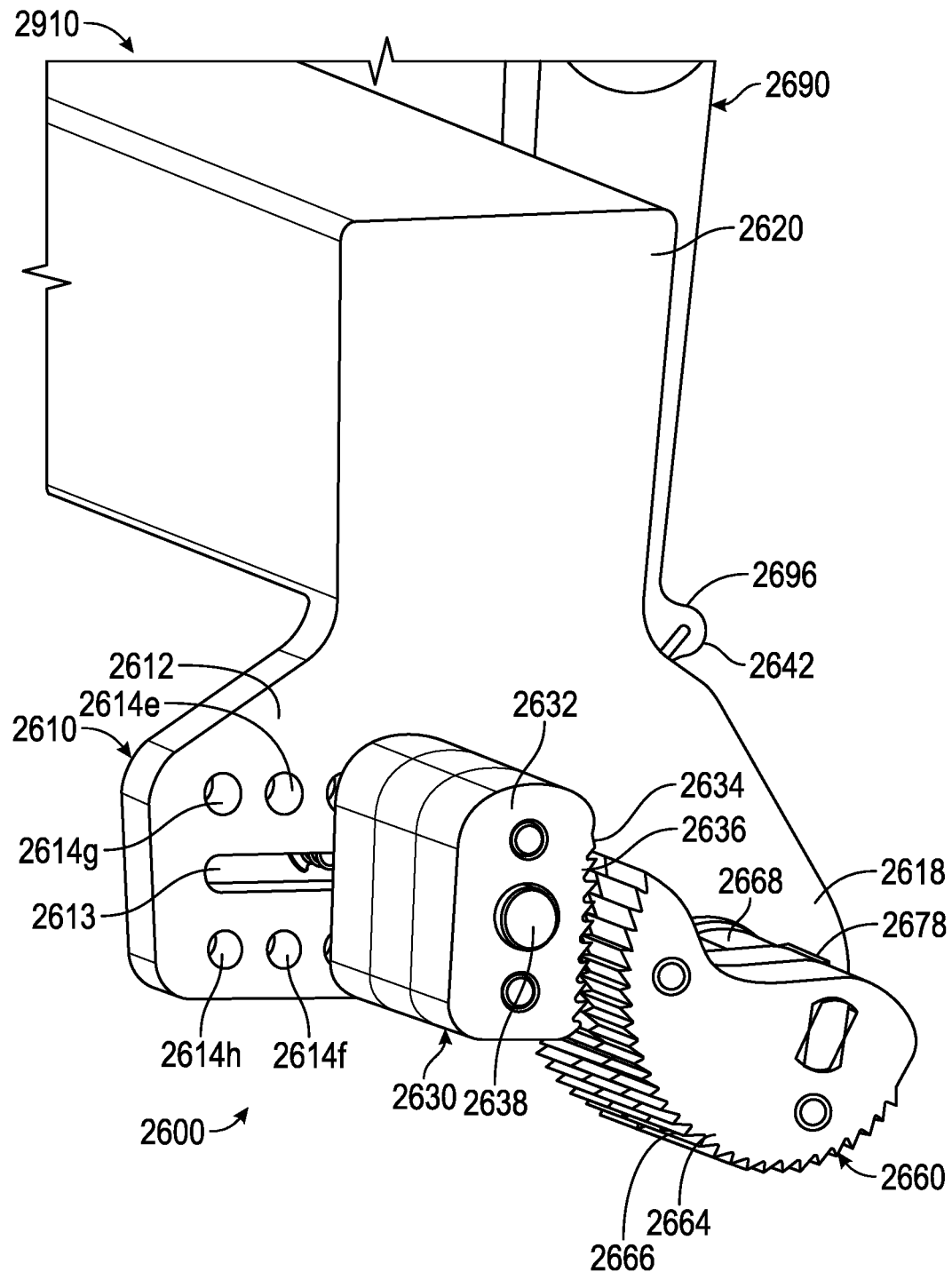
FIG. 21 is an enlarged fragmentary front perspective view of the gripper of the harvesting workstation of FIG. 19.
Figure 22:
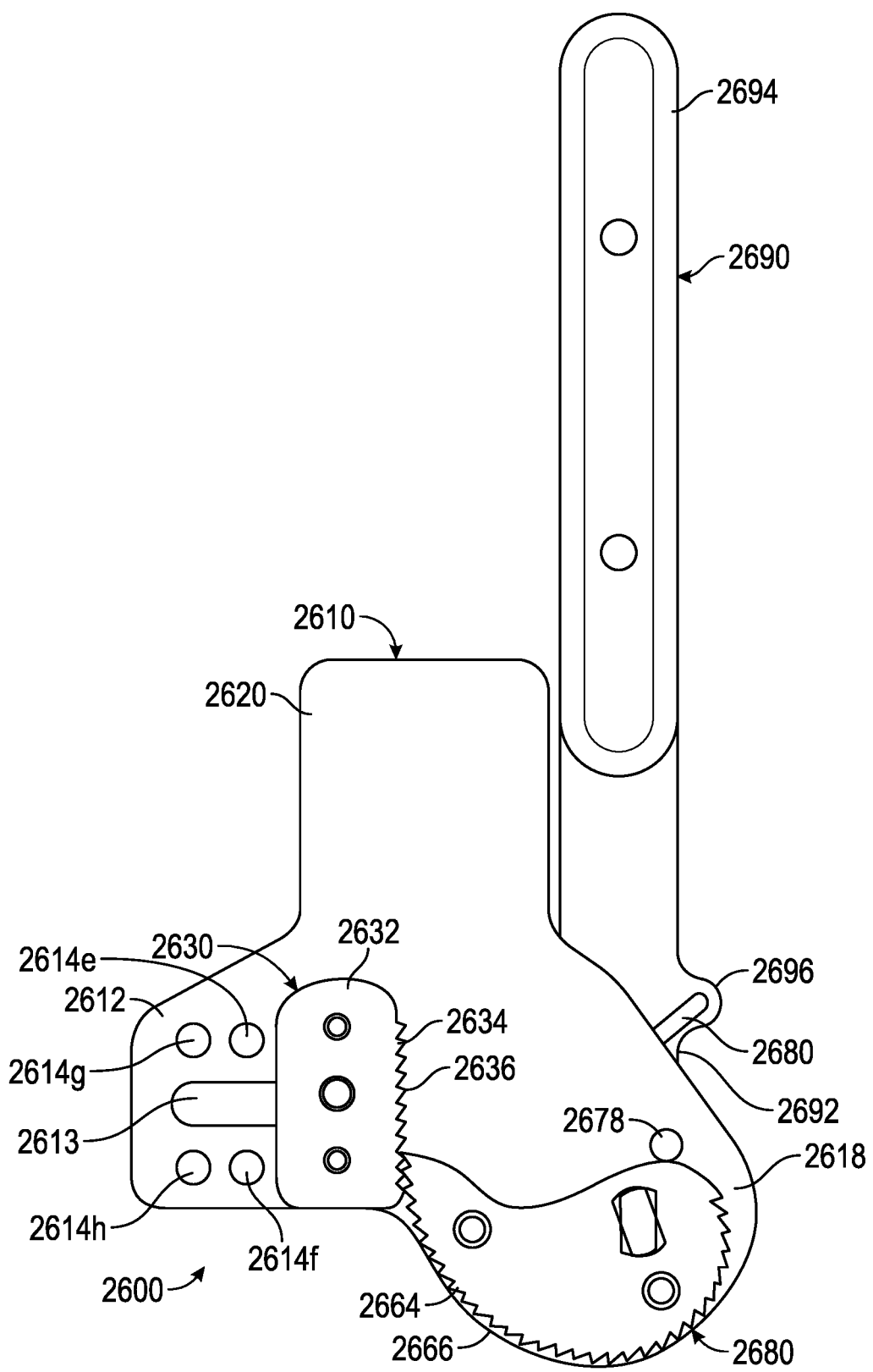
FIG. 22 is an enlarged fragmentary front view of the gripper of the harvesting workstation of FIG. 19.
Figure 23:
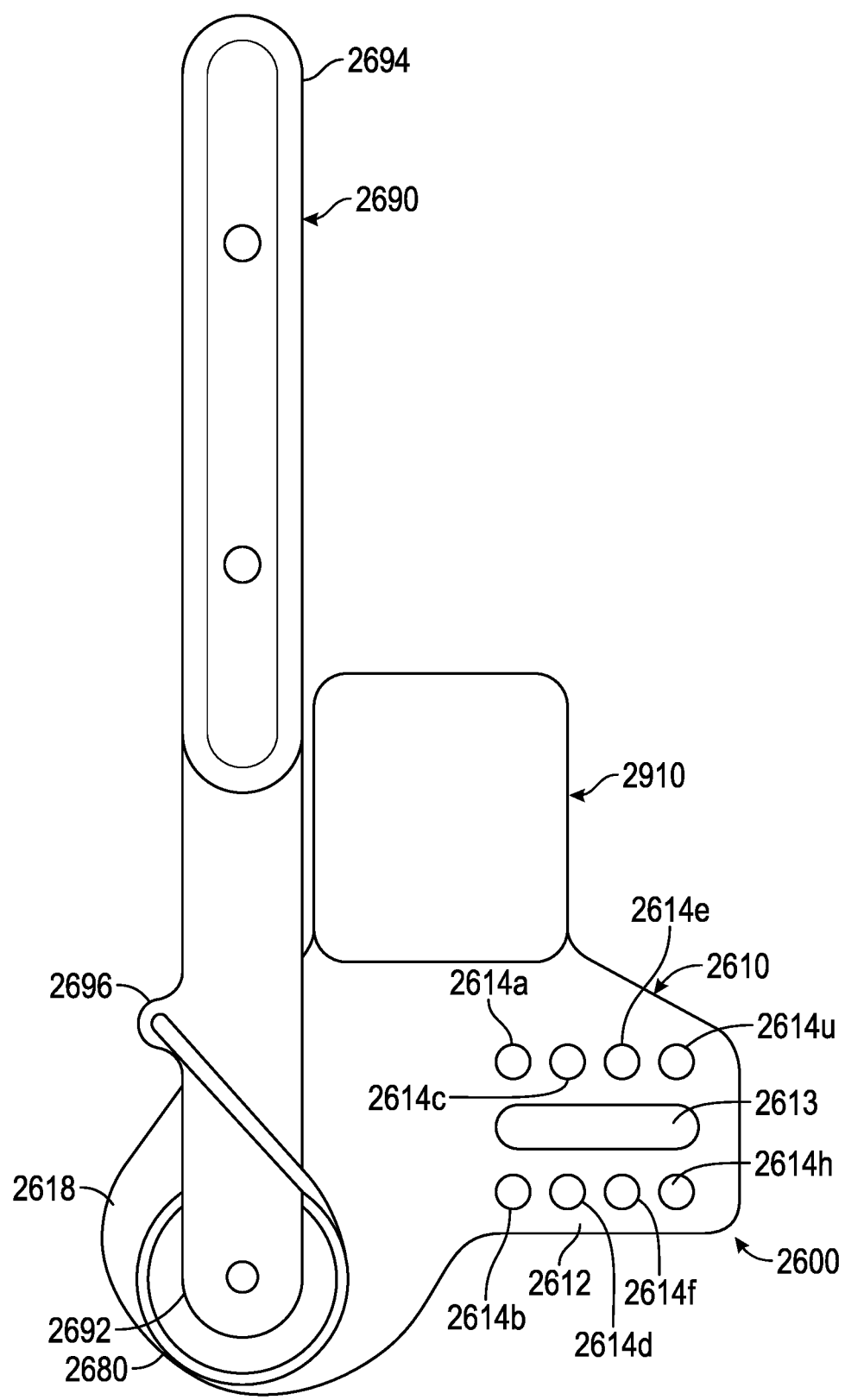
FIG. 23 is an enlarged fragmentary rear view of the gripper of the harvesting workstation of FIG. 19.
Figure 24:
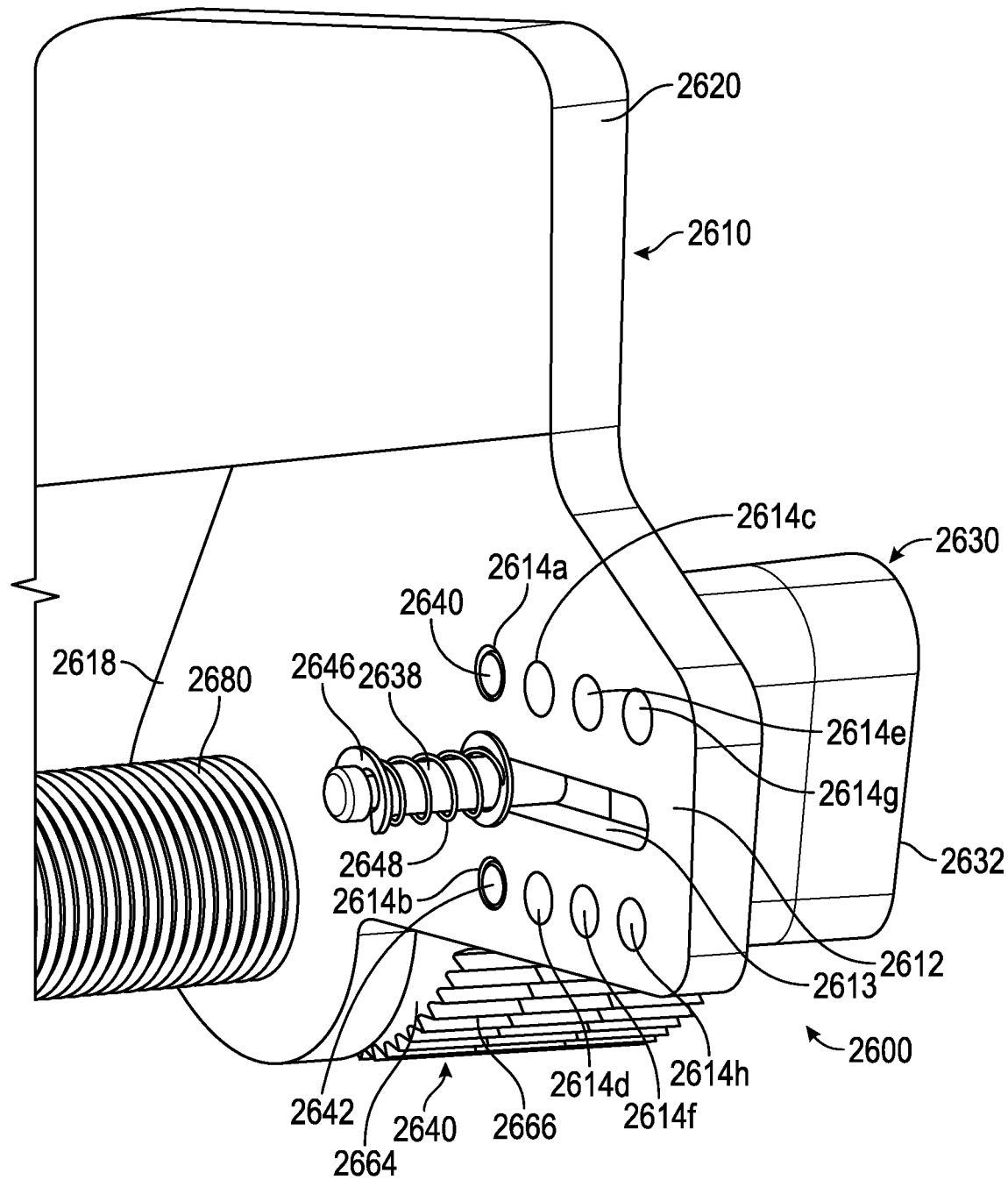
FIG. 24 is an enlarged fragmentary rear perspective view of the gripper of the harvesting workstation of FIG. 19.
Figure 25:
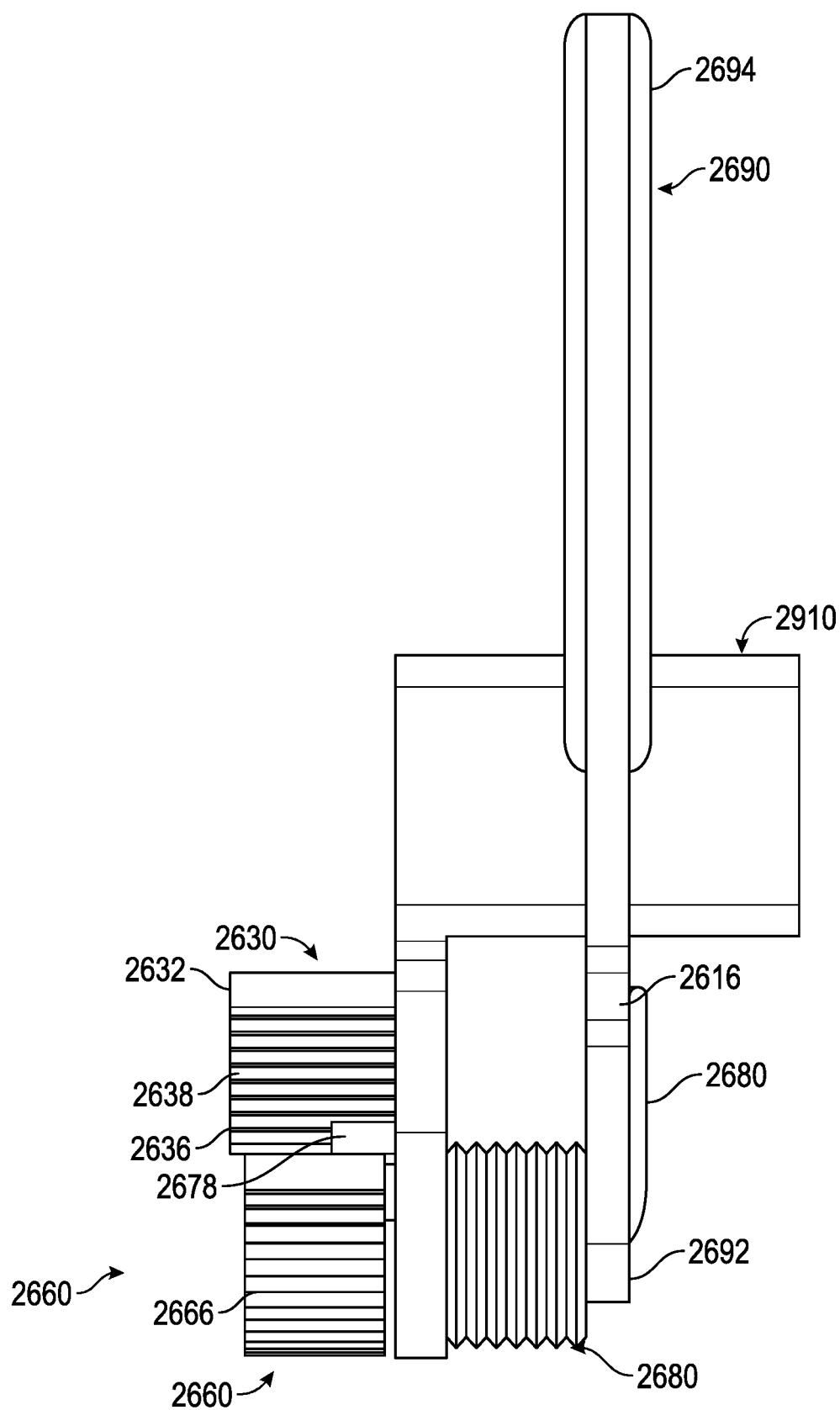
FIG. 25 is an enlarged fragmentary side view of the gripper of the harvesting workstation of FIG. 19.
Figure 28:
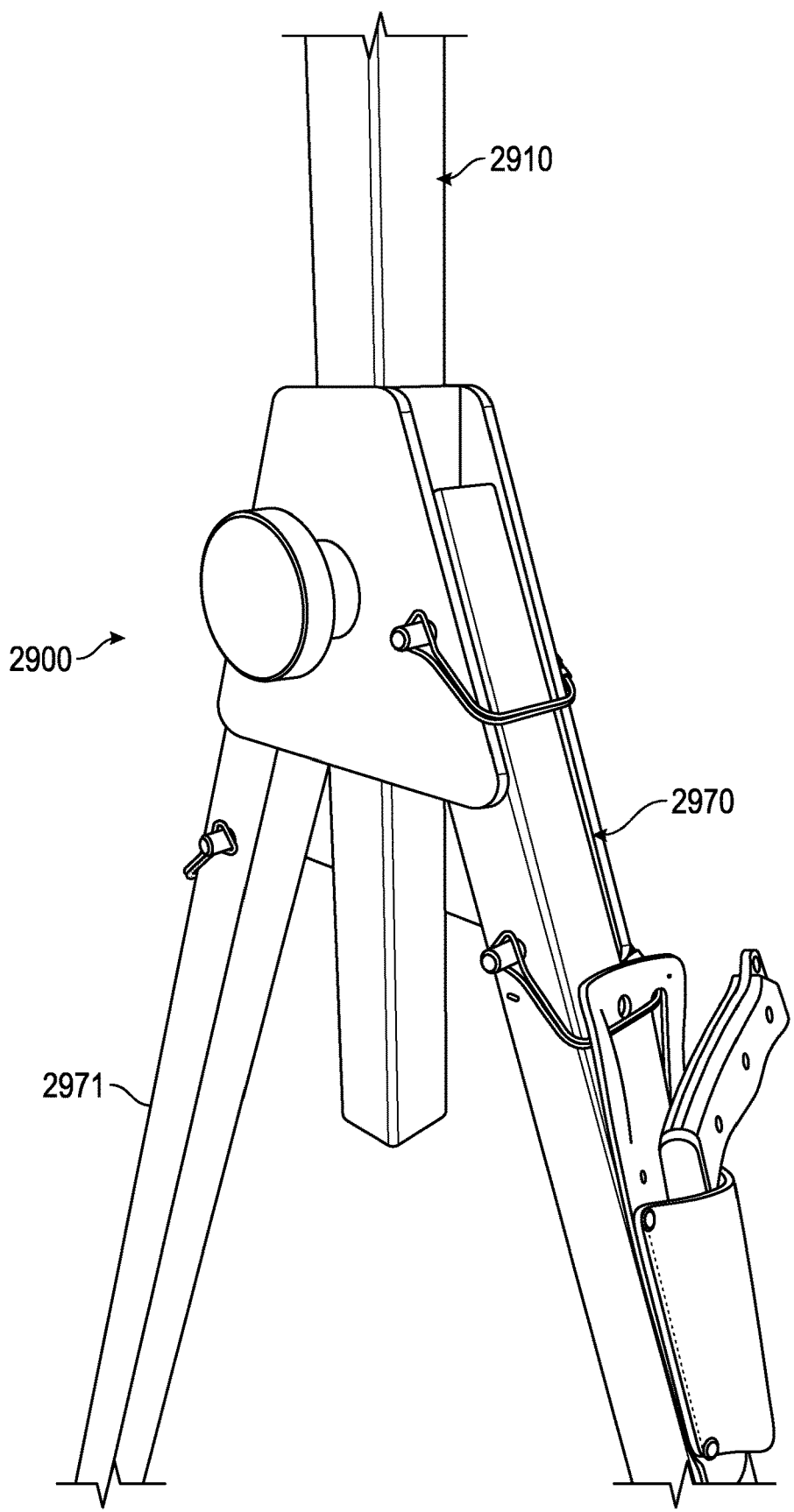
FIG. 28 is an enlarged fragmentary rear perspective view of the stand of the harvesting workstation of FIG. 19.

Various parts of the example stand 2900 are best shown in FIGS. 19, 20, 21, 25, 26, and 28. The example stand 2900 includes a gripper supporting arm 2910, a support bracket 2940, and two legs 2970 and 2974. The legs 2970 and 2974 are moveable between extended positions relative to the arm support 2940 (as shown in FIGS. 19 and 28) and retracted positions relative to the arm support 2940 (as shown in FIG. 20). The gripper supporting arm 2910 is movably connected to the support 2940 bracket at a plurality of different heights and extends from the arm support 2940. The gripper supporting arm 2910 is connected at the opposite end to the supporting arm attachment section 2620 of the base 2610. The example stand 2900 and specifically the gripper supporting arm 2910, the support bracket 2940, and the legs 2970 and 2974 are made from suitable metal materials; however, it should be appreciated that one or more of these components can be made from other suitable materials in accordance with the present disclosure. It should also be appreciated that the stand 29 that supports the gripper 2600 can be alternatively configured, shaped, and sized in accordance with the present disclosure.

It should further be appreciated that the in this example embodiment, the weight of the *cannabis* plant and additional downward forces on the *cannabis* plant due to the bucking causes the plant to be gripped tighter by the gripper 2600.

Seventh Example Harvesting Device

Figure 29:
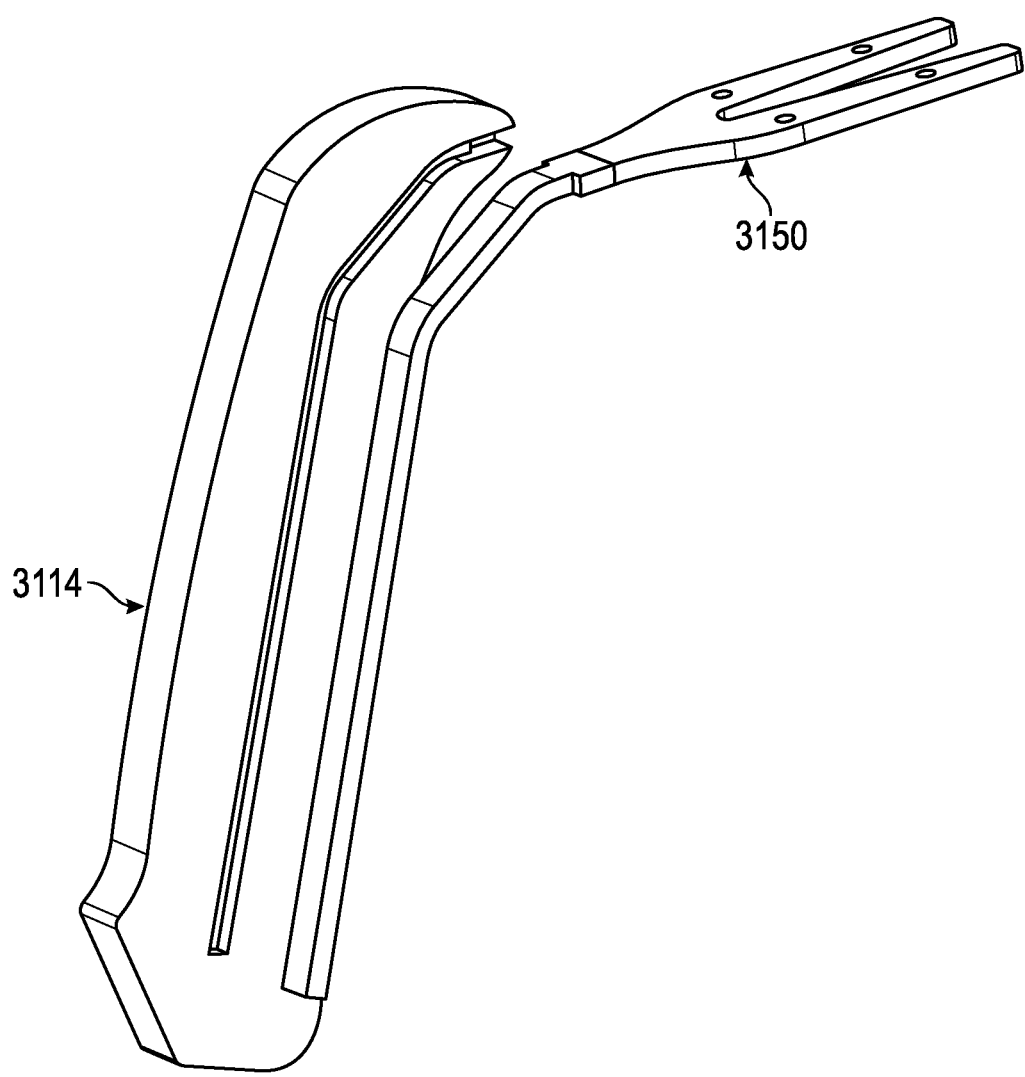
FIG. 29 is an enlarged perspective view of a non-powered handheld harvesting tool of another example embodiment of the present disclosure, shown without a full gripe for clarity.

Turning now to FIG. 29, part of a harvesting device in the form of a non-powered handheld harvesting tool 3100 of another example embodiment of the present disclosure is illustrated. This handheld harvesting tool 3100 generally includes a handle 3114, a blade support 3150 connected to the handle 3114, and a blade (not shown) removably connectable to the blade support 3150 by a plurality of fasteners (not shown). In this example embodiment, the blade is configured to be removed and replaced with a replacement blade as described above. In this example embodiment, the blade is supported by the blade support 3150, and thus the handle 3114 supports the blade support 3150 and the blade. In this illustrated example embodiment, the handle 3114 is configured to be part of a grip (not shown). This example is meant to illustrate that the handle and the grip can be alternatively configured in accordance with the present disclosure. This example is also meant to illustrate that the handle can be alternatively connected to the blade support in accordance with the present disclosure. In this example embodiment, the grip and the blade support are made from a suitable stainless steel metal material. In this example embodiment, the handle and the blade support are monolithically formed. It should be appreciated that they can be made from other suitable materials and formed in other manners in accordance with the present disclosure.

Coatings

The present disclosure further contemplates that parts of the harvesting devices of the present disclosure can include one or more suitable coatings. For example, the blade 150 of tool 100 can be coated with a protective non-stick coating such as a Polytetrafluoroethylene (PTFE) coating. In another example, the blade support 2150 and/or the blade 2250 of the of tool 2100 can be coated with a protective non-stick coating such as but not limited to a PTFE coating. In another example, the engagers 2630 and 2660 of the gripper 2600 can be coated with a protective non-stick coating such as but not limited to a PTFE coating. In various embodiments, such coatings can additionally be wear resistant.

Various Advantages and Benefits Provided by the Harvesting Devices of the Present Disclosure The harvesting devices of the present disclosure provide numerous advantages and benefits over various known harvesting apparatus and methods. These advantages and benefits include but are not limited to the following advantages and benefits.

Various embodiments of the harvesting devices of the present disclosure take into consideration the inherent advantages that the *cannabis* plant geometry provides for the rapid and efficient harvest of floral material from the *cannabis* plant.

Various embodiments of the harvesting devices of the present disclosure contemplate that a whole *cannabis* plants can be inverted and gripped securely by its base stem (such as just above where the base stem is cut from the ground).

Various embodiments of the harvesting devices of the present disclosure enable the bucking of the floral material from the *cannabis* plant without preprocessing or selective cutting of the stems of the *cannabis* plant.

Various embodiments of the harvesting devices of the present disclosure enable the automated bucking of the floral material from the *cannabis* plant.

Various embodiments of the harvesting devices of the present disclosure enable efficient bucking of the floral material from the stems of the *cannabis* plant via a handheld harvesting tool.

Various embodiments of the harvesting devices of the present disclosure eliminate the need for a user to repeatedly open and close the user's grip on the harvesting tool.

Various embodiments of the harvesting devices of the present disclosure eliminate the need for the user to perform a scissor motion.

Various embodiments of the harvesting devices of the present disclosure provide an organic grip for the user that does not require squeezing forces or manipulation to synch movable jaws or cutting edges.

Various embodiments of the harvesting devices of the present disclosure enable use on wet or dry materials, and particularly have nearly identical performance regardless of the moisture content of the *cannabis* plant. In various embodiments, wet bucked floral material can be dried through various mechanisms other than hanging the whole plant; providing *cannabis* farmers flexibility in their harvest plans.

Various embodiments of the harvesting devices of the present disclosure enable bucking with a precise tool instead of by hand or with imprecise machines, and thus enable the floral material to be removed in a more gentle fashion while maintaining a high throughput.

Various embodiments of the harvesting devices of the present disclosure can include one or more rubber members that are part or connected to the grip or the handle for providing additional user comfort. In various embodiments, the one or more rubber members can be connected to the grip or handle via an epoxy adhesive and/or one or more dowel pins.

Various embodiments of the harvesting devices of the present disclosure enable methods for harvesting *cannabis* plants, wherein each whole *cannabis* plant is selectively striped of its floral material by hand with a precise tool. These method include cutting the *cannabis* plant at its base, hanging the cut *cannabis* plant upside down by a stem, thereby presenting the *cannabis* plant and floral material thereof to a user in an upside-down fashion. The precise tool can be inserted over a clean portion of the upside down stem and then used to gently strip the floral material from that stem. In various embodiments, the harvested floral material can be collected in totes, and manually taken from the collection area. In various embodiments, a conveyor belt may remove the harvested floral product to be further processed.

In various embodiments, multiple the harvesting devices for suspending and presenting the *cannabis* plant in an upside-down fashion can be integrated into one harvesting workstation. Various embodiments also include the use of more than one harvesting tool per workstation. Such workstations enable efficient use of the harvesting tools such as by dedicating one or more users to hanging the *cannabis* plants, enabling one or more other users to buck the *cannabis* plants that are provided in a continuous or regular supply of suspended *cannabis* plants. Additionally, two or more workstations can be integrated together to create a process line. In various embodiments, the *cannabis* plants are loaded by a user and drawn by a conveyance mechanism to one or more users that use the harvesting tools to buck those *cannabis* plants.

It should be appreciated from the above, that one advantage of the harvesting devices and methods of the present disclosure is that they provide a scalable solution that can efficiently and effectively be used to harvest floral material from multiple whole *cannabis* plants, without compromising quality. The harvesting devices of the present disclosure can thus provide key benefits in labor, time, and quality with bucking whole *cannabis* plants.

INTERPRETATION OF CERTAIN TERMS OF THE PRESENT DISCLOSURE

The following should further be considered for interpretation of the present disclosure.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

It should be appreciated that certain embodiments of the powered harvesting devices of the present disclosure can be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably herein.

It should further be appreciated that the term "approximately" is intended to include values within ten percent of the specified value.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art that are also intended to be encompassed by the following claims.

The invention claimed is:

1. A *cannabis* plant harvesting tool comprising:
   a grip;
   a blade support connected to the grip, the blade support extending transversely from the grip, the blade support including two support fingers that define a first stem receiving channel; and
   a blade including two cutting fingers removably connectable to the two support fingers, wherein the two cutting fingers define a second stem receiving channel, wherein each of the two cutting fingers includes a cutting edge formed by a plurality of surfaces that define adjacent cutouts along substantially the entire length of that cutting finger, wherein:
      each of the cutouts is defined by a curved inner edge,
      each pair of adjacent cutouts is connected by a curved outer edge, and
      diameters of each of the respective adjacent cut-outs increase along the cutting finger from a first portion that is closer to the grip to a second portion that is further away from the grip.

2. The *cannabis* plant harvesting tool of claim 1, wherein the first stem receiving channel of the blade support is U-shaped.

3. The *cannabis* plant harvesting tool of claim 2, wherein the second stem receiving channel of the cutting fingers is V-shaped.

4. The *cannabis* plant harvesting tool of claim 1, wherein the second stem receiving channel of the cutting fingers is V-shaped.

5. The *cannabis* plant harvesting tool of claim 1, wherein the first stem receiving channel of the blade support is aligned with the second stem receiving channel of the cutting fingers when the blade is connected to the blade support.

6. The *cannabis* plant harvesting tool of claim 1, wherein the support fingers define fastener receiving openings that extend through the support fingers.

7. The *cannabis* plant harvesting tool of claim 6, wherein the blade defines threaded fastener receiving openings.

8. The *cannabis* plant harvesting tool of claim 7, wherein fastener receiving openings of the blade support are configured to receive fasteners that extend through the fastener receiving openings of the blade support and into the fastener receiving openings of the blade to connect the blade to the support fingers.

9. The *cannabis* plant harvesting tool of claim 1, where the two cutting fingers of the blade are connected by a base and extend from the base.

10. A *cannabis* plant harvesting tool comprising:
    a grip;
    a blade support connected to the grip, the blade support extending transversely from the grip, the blade support including two support fingers that define a first U-Shaped stem receiving channel, wherein the blade support fingers define fastener receiving openings;
    a blade including two cutting fingers removably connectable to the two support fingers, wherein the two cutting fingers define a second V-shaped stem receiving channel, wherein the blade defines fastener receiving openings, wherein each of the two cutting fingers includes a cutting edge formed by a plurality of surfaces that define adjacent cutouts along substantially the entire length of that cutting finger, wherein:
       each of the cutouts is defined by a curved inner edge,
       each pair of adjacent cutouts is connected by a curved outer edge, and
       diameters of each of the respective adjacent cut-outs increase along the cutting finger from a first portion that is closer to the grip to a second portion that is further away from the grip; and
    a plurality of fasteners that extend through the fastener receiving openings of the blade support and into the fastener receiving openings of the blade.

11. The *cannabis* plant harvesting tool of claim 10, wherein the first stem receiving channel of the blade support is aligned with the second stem receiving channel of the blade when the blade is connected to the blade support by the fasteners.

12. The *cannabis* plant harvesting tool of claim 10, where the two cutting fingers of the blade are connected by a base and extend from the base.

13. A *cannabis* plant harvesting tool blade for a *cannabis* plant harvesting tool including a grip and a blade support connected to the grip and extending transversely from the grip, the blade support including two support fingers that define a first stem receiving channel, the *cannabis* plant harvesting tool blade comprising:
    a first cutting finger; and
    a second cutting finger,
       wherein the first and second cutting fingers are removably connectable to the two support fingers, wherein the two cutting fingers define a second stem receiving channel, wherein each of the first cutting finger and the second cutting finger includes a cutting edge formed by a plurality of surfaces that define adjacent cutouts along substantially the entire length of that cutting finger, wherein:
       each of the cutouts is defined by a curved inner edge,
       each pair of adjacent cutouts is connected by a curved outer edge, and
       diameters of each of the respective adjacent cut-outs increase along the cutting finger from a first portion that is closer to a second portion that is further away from the grip.

14. The *cannabis* plant harvesting tool blade of claim 13, wherein the second stem receiving channel is V-shaped.

15. The *cannabis* plant harvesting tool blade of claim 13, wherein the first and second cutting fingers wherein define fastener receiving openings.

16. The *cannabis* plant harvesting tool blade of claim 13, where the two cutting fingers of the blade are connected by a base and extend from the base.

\* \* \* \* \*